United States Patent
Li et al.

(10) Patent No.: US 12,417,321 B2
(45) Date of Patent: Sep. 16, 2025

(54) VOLTAGE MODE WEAK-PUF CIRCUIT WITH RICH CHALLENGE-RESPONSE PAIRS

(71) Applicant: Wenzhou University, Zhejiang (CN)

(72) Inventors: Gang Li, Zhejiang (CN); Pengjun Wang, Zhejiang (CN); Hui Li, Zhejiang (CN); Ziyu Zhou, Zhejiang (CN)

(73) Assignee: Wenzhou University, Zhejiang (CN)

( * ) Notice: Subject to any disclaimer, the term of this patent is extended or adjusted under 35 U.S.C. 154(b) by 143 days.

(21) Appl. No.: 18/418,350

(22) Filed: Jan. 22, 2024

(65) Prior Publication Data

US 2025/0148132 A1 May 8, 2025

(30) Foreign Application Priority Data

Nov. 7, 2023 (CN) .......................... 202311468408.7

(51) Int. Cl.
*G06F 21/75* (2013.01)
*G06F 21/73* (2013.01)

(52) U.S. Cl.
CPC .............. *G06F 21/75* (2013.01); *G06F 21/73* (2013.01); *G06F 2221/2103* (2013.01)

(58) Field of Classification Search
None
See application file for complete search history.

(56) References Cited

U.S. PATENT DOCUMENTS

2019/0058602 A1* 2/2019 Wang ...................... G06F 21/72
2019/0114097 A1* 4/2019 Tran ........................ G11C 29/48

OTHER PUBLICATIONS

Nimesh Shah et al., "Reconfigurable Leakage-based Weak PUF in 65nm CMOS with 0.63% instability", 2023 IEEE International Symposium on Circuits and Systems (ISCAS), Jul. 2023, pp. 1-5.

(Continued)

*Primary Examiner* — Anh Q Tran
(74) *Attorney, Agent, or Firm* — JCIPRNET

(57) ABSTRACT

A voltage mode weak-PUF circuit with rich challenge-response pairs comprises four decoders, two PUF arrays, a sequential control circuit and a voltage comparator. One-to-two PUF arrays are used to replace existing one-to-one PUF arrays to increase the number of challenge-response pairs by $2^N$ times, from $2^N$ realized by the one-to-one PUF arrays to $2^N \times 2^N$, wherein N=a+b. Each PUF cell comprises m*n PUF cells and n transmission gates, and adopts a simple common-source amplifier structure formed by a first PMOS transistor, a first NMOS transistor and a second NMOS transistor, wherein any one PUF cell in one PUF array can be compared with any one PUF cell in the other PUF array to generate an output response. The number of output responses is $2^N$, so the proportion of the PUF cells for generating one challenge-response pair is $2^N/2^N=1/2^N$, and the reuse rate of the same PUF cell is merely $1/2^N$.

9 Claims, 13 Drawing Sheets

(56) References Cited

OTHER PUBLICATIONS

Mahshid Delavar et al., "A Ring Oscillator-Based PUF With Enhanced Challenge-Response Pairs", Canadian Journal of Electrical and Computer Engineering, vol. 39, Jun. 2016, pp. 174-180.

Lu Lu et al., "A Sequence-Dependent Configurable PUF Based on 6T SRAM for Enhanced Challenge Response Space", 2019 IEEE International Symposium on Circuits and Systems (ISCAS), May 2019, pp. 1-5.

* cited by examiner

VOLTAGE MODE WEAK-PUF CIRCUIT WITH RICH CHALLENGE-RESPONSE PAIRS

CROSS-REFERENCE TO RELATED APPLICATION

This application claims the priority benefit of China application no. 202311468408.7, filed on Nov. 7, 2023. The entirety of the above mentioned patent application is hereby incorporated by reference herein and made a part of this specification.

BACKGROUND

1. Technical Field

The invention relates to weak-PUF circuits, in particular to a voltage mode weak-PUF circuit with rich challenge-response pairs.

2. Description of Related Art

The physically unclonable function (PUF), as a chip fingerprint extraction technique, can realize secure data storage and information-exchange authentication by means of unique textural feature information of integrated circuits in combination with various cryptographic algorithms and security protocols, and has the characteristics of low expenditure, high security, high robustness, and the like, thus having been gradually applied to the field of IoT security.

According to the capacity to generate challenge response pairs (CRPs), PUF circuits are classified as strong PUF circuits and weak PUF circuits. Wherein, the number of CRPs generated by the strong PUF circuits increases exponentially with the area of the strong PUF circuits. The strong PUF circuits with a large number of CRPs can be used for identity authentication of lightweight equipment, state verification, key generation, and the like. However, due to the reuse of hardware structures of the strong PUF circuits, there is an inevitable correlation between CRPs output by the strong PUF circuits, and the correlation becomes higher with the increase of the reuse rate. Therefore, the strong PUF circuits are easily attacked by machine learning (ML) algorithms such as logistic regression (LR), support vector machine (SVM) and artificial neural network (ANN). Attackers can simulate challenge-response behaviors almost the same as those of a target strong PUF circuit only by collecting a small number of exposed CRPs. The number of CRPs of the weak PUF circuits increases linearly with the area of the weak PUF circuits. The weak PUF circuits, due to its limited number of CRPs, are used within a limited range, mainly for key generation of IoT systems.

To increase of the number of CRPs generated by the weak PUF circuits, reduce the hardware expenditure and expand the application scenarios of the weak PUF circuits, scientific researchers conducted studies on the cell structure and configuration of the weak PUF circuits. In Literature N. Shah and A. Basu. *Reconfigurable Leakage-based Weak PUF in 65 nm CMOS with 0.63% instability*[C]. 2023 *IEEE International Symposium on Circuits and Systems (ISCAS)*, Monterey, CA, USA, 2023, pp. 1-5, in order to reduce the hardware expenditure, a differential weak PUF cell structure is proposed based on a static monostable weak PUF structure formed by a single-terminal PUF cell composed of two MOS transistors and two inverters, and the differential weak PUF cell compares two output voltages by means of a sensitive amplifier and an inverter to output a voltage response. In the differential weak PUF cell, the single-terminal cell is composed of two MOS transistors and can adopt minimum-sized transistors without changing the stability, thus reducing the hardware expenditure. Moreover, if an NMOS transistor is added to each of two single-terminal cells of the differential weak PUF cells, the number of CRPs can be increased by two times, from 4,096 to 8,192, by turning on or off the added NMOS transistors. Therefore, when a PUF circuit formed by the differential weak PUF cells is adopted, reuse of the PUF cells is avoided, so the PUF circuit can theoretically resist ML modeling attacks. However, the characteristic dimension of the differential weak PUF cell is still $1364F^2$, so the hardware expenditure is still large. In Literature M. Delavar, S. Mirzakuchaki and J. Mohajeri. A *Ring Oscillator-Based PUF With Enhanced Challenge-Response Pairs*[J]. *Canadian Journal of Electrical and Computer Engineering*, vol. 39, no. 2, pp. 174-180, Spring 2016, a traditional ring oscillator-based weak PUF is configured to increase the number of CRPs of a ring oscillator-based PUF formed by n (512) ring oscillators by (n−1) times, from n/2 to (n−1)n/2. Although the number of CRPs of the ring oscillator-based PUF is increased, the use of the ring oscillators formed by an odd number (greater than 3) of inverters as PUF cells leads to a large hardware expenditure of the PUF cells. Since any two PUF cells can be combined to output responses, the reuse rate of the PUF cells is 2/n and is high, and the output responses may be easily hacked by ML modeling attacks, leading to the security risk of key leaking. In Literature L. Lu and T. T.-H. Kim. *A Sequence-Dependent Configurable PUF Based on 6T SRAM for Enhanced Challenge Response Space*[C]. 2019 *IEEE International Symposium on Circuits and Systems (ISCAS)*, Sapporo, Japan, 2019, pp. 1-5, a 2D sequence-dependent PUF based on SRAM is proposed, which, by reconfiguring rows and columns of a traditional SRAM structure, can disassemble the SRAM structure to configure a new SRAM cell (PUF cell), and the number of CRPs of the PUF can be increased by (N−1) times, wherein N is the number of PUF cells. However, because one SRAM cell requires 6 MOS transistors and two selection cells are needed for selective configuration of the SRAM cells, the cell area of each bit of output is large, and the characteristic dimension is $1297F^2$. The reuse rate of the SRAM cells in the 2D sequence-dependent PUF is 1/n, which is high, so the 2D sequence-dependent PUF can be easily hacked by ML modelling attacks, leading to key leaking.

SUMMARY

The technical issue to be settled by the invention is to provide a voltage mode weak-PUF circuit with rich challenge-response pairs, which has a large number of challenge-response pairs and a small hardware expenditure and can resist ML modeling attacks.

The technical solution adopted by the invention to settle the above technical issue is as follows: a voltage mode weak-PUF circuit with rich challenge-response pairs comprises four decoders, two PUF arrays, a sequential control circuit and a voltage comparator, wherein each PUF array comprises m*n PUF cells and n transmission gates, $m=2^a$, a is an integer greater than or equal to 1, $n=2^b$, b is an integer greater than or equal to 1, the m*n PUF cells are distributed in m rows and n columns, the n transmission gates are distributed in one row and n columns, each transmission gate has a control terminal, an input terminal and an output terminal, each PUF cell has a first input terminal, a second input terminal and an output terminal, and comprises a first PMOS transistor, a first NMOS transistor and a second NMOS transistor, a supply voltage (VDD) is accessed to a source of the first PMOS transistor, a gate of the first PMOS transistor, a drain of the first PMOS transistor and a drain of the second NMOS transistor are connected and a connecting terminal thereof is the output terminal of the PUF cell, a gate of the second NMOS transistor is the second input terminal of the PUF cell, a source of the second NMOS transistor and a drain of the first NMOS transistor are connected, a gate of the first NMOS transistor is the first input terminal of the PUF cell, and a source of the first NMOS transistor is grounded; in each PUF array, the first input terminals of the n PUF cells in the $j^{th}$ row are connected and a connecting terminal thereof is a $j^{th}$ row address input terminal of the PUF array, j=1, 2, . . . , m, a first row address input terminal to an $m^{th}$ row address input terminal of the PUF array form an m-bit row address input terminal of the PUF array, the second input terminals of the m*n PUF cells are connected and a connecting terminal thereof is a sub-threshold input terminal of the PUF array, to which a sub-threshold voltage VBB is accessed, the control terminal of the $k^{th}$ transmission gate is a $k^{th}$ column address input terminal of the PUF array, k=1, 2, . . . , n, a first column address input terminal to an $n^{th}$ column address input terminal of the PUF array form an n-bit column address input terminal of the PUF array, and the input terminal of the $k^{th}$ transmission gate is connected to the output terminals of the m PUF cells in the $k^{th}$ column; the output terminals of the n transmission gates are connected and a connecting terminal thereof is an output terminal of the PUF array; the two PUF arrays are referred to as a first PUF array and a second PUF array respectively; the sequential control circuit is configured to provide an enable control signal for the four decoders and the voltage comparator to enable the four decoders, the two PUF arrays and the voltage comparator to operate cooperatively in a preset sequence; the four decoders are referred to a first decoder, a second decoder, a third decoder and a fourth decoder respectively; a first row selection signal is accessed to the first decoder and is converted by the first decoder into a first m-bit row address signal, which is output to the m-bit row address input terminal of the first PUF array, a first column selection signal is accessed to the second decoder and is converted by the second decoder into a first n-bit column address signal, which is output to the n-bit column address input terminal of the first PUF array, the first m-bit row address signal is used for selecting n PUF cells in one row of the first PUF array to enable the n PUF cells in said row to enter an operating state to generate output signals, the first n-bit column address signal is used for selecting one PUF cells from the n selected PUF cells in the first PUF array and outputting an output signal generated by the selected PUF cell to the voltage comparator, as an output signal of the first PUF array, a second row selection signal is accessed to the third decoder and is converted by the third decoder into a second m-bit row address signal, which is output to the m-bit row address input terminal of the second PUF array, a second column selection signal is accessed to the fourth decoder and is converted by the fourth decoder into a second n-bit column address signal, which is output to the n-bit column address input terminal of the second PUF array, the second m-bit row address signal is used for selecting n PUF cells in one row of the second PUF array to enable the n PUF cells in said row to enter an operating state to generate output signals, the second n-bit column address signal is used for selecting one PUF cell from the n selected PUF cells in said row of the second PUF array and outputting an output signal generated by the selected PUF cell to the voltage comparator, as an output signal of the second PUF array, and the voltage comparator is configured to compare the two output signals output thereto by the first PUF array and the second PUF array to obtain and output a response signal.

m is equal to 64, n is equal to 8, the first decoder and the second decoder are both 6-bit decoders and are able to convert 6-bit binary data output thereto into 64-bit binary data and output the 64-bit binary data, the second decoder and the fourth decoder are both 3-bit decoders and are able to convert 3-bit binary data output thereto into 8-bit binary data and output the 8-bit binary data, the first row selection signal and the second row selection signal are both 6-bit binary data, and the first column selection signal and the second column selection signal are both 3-bit binary data; the sequential control circuit generates a first enable control signal EN_L and a second enable control signal EN_C, wherein the first enable control signal EN_L is output to the first decoder, the second decoder, the third decoder and the fourth decoder respectively, and the second enable control signal EN_C is output to the voltage comparator; when the first enable control signal EN_L is a high level, the first decoder and the third decoder operate to perform decoding, and the second decoder and the fourth decoder do not operate and hold the current state; when the first enable controls signal EN_L is a low level, the first decoder and the third decoder do not operate and hold the current state, and the second decoder and the fourth decoder operate to perform decoding; when the second enable control signal EN_C is a high level, the voltage comparator operates to compare the output signals output thereto by the two PUF arrays to obtain and output the response signal; and when the second enable control signal EN_C is a low level, the voltage comparator is turned off, and no valid value is output via an output terminal of the voltage comparator.

The voltage comparator has a first input terminal, a second input terminal, an enable terminal, a first calibration terminal, a second calibration terminal and an output terminal, wherein the first input terminal of the voltage comparator is connected to the output terminal of the first PUF array, the second input terminal of the voltage comparator is connected to the output terminal of the second PUF array, the enable terminal of the voltage comparator is connected to the sequential control circuit and allows the second enable control signal EN_C to be accessed thereto, a first calibration voltage Vcm is accessed to the first calibration terminal of the voltage comparator, a second calibration voltage Vcp is accessed to the second calibration terminal of the voltage comparator, and the first calibration voltage Vcm and the second calibration voltage Vcp are used for enabling the proportion of response signals 0/1 output by the output terminal of the voltage comparator to be close to a desired value 50%; the voltage comparator comprises a second PMOS transistor, a third PMOS transistor, a fourth PMOS transistor, a fifth PMOS transistor, a sixth PMOS transistor, a seventh PMOS transistor, a third NMOS transistor, a fourth NMOS transistor, a fifth NMOS transistor, a sixth NMOS transistor, a seventh NMOS transistor, an eighth NMOS transistor and a ninth NMOS transistor, the supply voltage VDD is accessed to a source of the second PMOS transistor, a source of the third PMOS transistor, a source of the fourth PMOS transistor, a source of the fifth PMOS transistor, a source of the sixth PMOS transistor and a source of the seventh PMOS transistor, a gate of the second PMOS transistor, a gate of the fourth PMOS transistor, a gate of the third PMOS transistor, a gate of the third NMOS transistor and a gate of the seventh PMOS transistor are connected and a connecting terminal thereof is the enable terminal of the voltage comparator, a drain of the second PMOS transistor, a source of the eighth NMOS transistor, a drain of the fourth NMOS transistor and a drain of the fifth NMOS transistor are connected, a drain of the third PMOS transistor, a source of the ninth NMOS transistor, a drain of the sixth NMOS transistor and a drain of the seventh NMOS transistor are connected, a drain of the fourth PMOS transistor, a drain of the fifth PMOS transistor, a drain of the eighth NMOS transistor, a gate of the sixth PMOS transistor and a gate of the ninth NMOS transistor are connected, a gate of the fifth PMOS transistor, a gate of the eighth NMOS transistor, a drain of the sixth PMOS transistor, a drain of the seventh PMOS transistor and a drain of the ninth NMOS transistor are connected and a connecting terminal thereof is the output terminal of the voltage comparator, a source of the third NMOS transistor is grounded, a drain of the third NMOS transistor, a drain of the fourth NMOS transistor, a drain of the fifth NMOS transistor, a drain of the sixth NMOS transistor and a drain of the seventh NMOS transistor are connected, a gate of the fourth NMOS transistor is the second calibration terminal of the voltage comparator, a gate of the fifth NMOS transistor is the second input terminal of the voltage comparator, a gate of the sixth NMOS transistor is the first input terminal of the voltage comparator, and a gate of the seventh NMOS transistor is the first calibration terminal of the voltage comparator.

The sequential control circuit comprises an eighth PMOS transistor, a ninth PMOS transistor, a tenth PMOS transistor, an eleventh PMOS transistor, a tenth NMOS transistor, an eleventh NMOS transistor, a twelfth NMOS transistor, a thirteenth NMOS transistor, a first inverter, a second inverter, a third inverter, two two-input AND gates and a delay cells, wherein each two-input AND gate has a first input terminal, a second input terminal and an output terminal, the two two-input AND gates are referred to a first AND gate and a second AND gate respectively, the delay cell is formed by multiple buffers connected in series and has an input terminal and an output terminal, the supply voltage VDD is accessed to a source of the ninth PMOS transistor and a source of the eleventh PMOS transistor, a gate of the ninth PMOS transistor and a gate of the tenth NMOS transistor are connected and a connecting terminal thereof is an enable terminal of the sequential control circuit, to which an enable signal CEN is accessed, a drain of the ninth PMOS transistor and a source of the eighth PMOS transistor are connected, a gate of the eighth PMOS transistor, a gate of the thirteenth NMOS transistor, the second input terminal of the first AND gate and an input terminal of the second inverter are connected and a connecting terminal thereof is a clock terminal of the sequential control circuit, to which a clock signal CLK is accessed, a drain of the eighth PMOS transistor, a drain of the eleventh NMOS transistor, a drain of the tenth PMOS transistor, a drain of the thirteenth NMOS transistor and an input terminal of the first inverter, a gate of the eleventh NMOS transistor, a gate of the tenth PMOS transistor and an output terminal of the second inverter are connected, a source of the eleventh NMOS transistor and a drain of the tenth NMOS transistor are connected, a source of the tenth NMOS transistor is grounded, a gate of the eleventh PMOS transistor, a gate of the twelfth NMOS transistor, an output terminal of the first inverter and the first input terminal of the first AND gate are connected, a drain of the eleventh PMOS transistor and a source of the tenth PMOS transistor are connected, a source of the thirteenth NMOS transistor and a drain of the twelfth NMOS transistor are connected, a source of the twelfth NMOS transistor is grounded, the output terminal of the first AND gate, the input terminal of the delay cell and the second input terminal of the second AND gate are connected and a connecting terminal thereof is a first output terminal of the sequential control circuit, which is used for outputting the first enable control signal EN_L, the output terminal of the delay cell is connected to an input terminal of the third inverter, an output terminal of the third inverter is connected to the first input terminal of the second AND gate, and the output terminal of the second AND gate is a second output terminal of the sequential control circuit, which is used for outputting the second enable control signal EN_C.

The delay cell is formed by 20 buffers connected in series, wherein an input terminal of a first buffer is the input terminal of the delay cell, an output terminal of a twentieth buffer is the output terminal of the delay cell, an output terminal of a $d^{th}$ buffer is an input terminal of a $(d+1)^{th}$ buffer, and d=1, 2, . . . , 19.

The 6-bit decoder comprises three decoder front-end cells and 64 three-input AND gates, wherein each three-input AND gate has a first input terminal, a second input terminal, a third input terminal and an output terminal, the 64 three-input AND gates are referred to a first AND gate to a sixty-fourth AND gate respectively, each decoder front-end cell has an enable terminal, two input terminals and four output terminals, and the three decoder front-end cells are referred to a first decoder front-end cell, a second decoder front-end cell and a third decoder front-end cell respectively; the enable terminals of the three decoder front-end cells are connected and a connecting terminal thereof is an enable terminal of the 6-bit decoder, to which the first enable control signal EN_L is accessed, the two input terminals of the first decoder front-end cell, the two input terminals of the second decoder front-end cell and the two input terminals of the third decoder front-end cell form a 6-bit input terminal of the 6-bit decoder, to which 6-bit binary data is accessed, the output terminals of the first AND gate to the sixty-fourth AND gate form a 64-bit output terminal of the 6-bit decoder, which is used for outputting 64-bit binary data, the four output terminals of the first decoder front-end cell are respectively connected to the first input terminals of the first, second, third and fourth AND gates, the first input terminals of the fifth, sixth, seventh and eighth AND gates, the first input terminals of the ninth, tenth, eleventh and twelfth AND gates, the first input terminals of the thirteenth, fourteenth, fifteenth and sixteenth AND gates, the first input terminals of the seventeenth, eighteenth, nineteenth and twentieth AND gates, the first input terminals of the twenty-first, twenty-second, twenty-third and twenty-fourth AND gates, the first input terminals of the twenty-fifth, twenty-sixth, twenty-seventh and twenty-eighth AND gates, the first input terminals of the twenty-ninth, thirtieth, thirty-first and thirty-second AND gates, the first input terminals of the thirty-third, thirty-fourth, thirty-fifth and thirty-sixth AND gates, the first input terminals of the thirty-seventh, thirty-eighth, thirty-ninth and fortieth AND gates, the first input terminals of the forty-first, forty-second, forty-third and forty-fourth AND gates, the first input terminals of the forty-fifth, forty-sixth, forty-seventh and forty-eighth AND gates, the first input terminals of the forty-ninth, fiftieth, fifty-first and fifty-second AND gates, the first input terminals of the fifty-third, fifty-fourth, fifty-fifth and fifty-sixth AND gates, the first input terminals of the fifty-seventh, fifty-eighth, fifty-ninth and sixtieth AND gates, and the first input terminals of the sixty-first, sixty-second, sixty-third and sixty-fourth AND gates in a one-to-one corresponding manner, a first output terminal of the second decoder front-end cell is respectively connected to the second input terminals of the first, second, third and fourth AND gates, the second input terminals of the seventeenth, eighteenth, nineteenth and twentieth AND gates, the second input terminals of the thirty-third, thirty-fourth, thirty-fifth and thirty-sixth AND gates, the second input terminals of the forty-ninth, fiftieth, fifty-first and fifty-second AND gates, and the second input terminals of the fifty-third, fifty-fourth, fifty-fifth and fifty-sixth AND gates, a third output terminal of the second decoder front-end cell is respectively connected to the second input terminals of the ninth, tenth, eleventh and twelfth AND gates, the second input terminals of the twenty-fifth, twenty-sixth, twenty-seventh and twenty-eighth AND gates, the second input terminals of the forty-first, forty-second, forty-third and forty-fourth AND gates, and the second input terminals of the fifty-seventh, fifty-eighth, fifty-ninth and sixtieth AND gates, a fourth output terminal of the second decoder front-end cell is respectively connected to the second input terminals of the thirteenth, fourteenth, fifteenth and sixteenth AND gates, the second input terminals of the twenty-ninth, thirtieth, thirty-first and thirty-second AND gates, the second input terminals of the forty-fifth, forty-sixth, forty-seventh and forty-eighth AND gates, and the second input terminals of the sixty-first, sixty-second, sixty-third and sixty-fourth AND gates, a first output terminal of the third decoder front-end cell is respectively connected to the third input terminals of the first, second, third, fourth, fifth, sixth, seventh, eighth, ninth, tenth, eleventh, twelfth, thirteenth, fourteenth, fifteenth and sixteenth AND gates, a second output terminal of the third decoder front-end cell is respectively connected to the third input terminals of the seventeenth, eighteenth, nineteenth, twentieth, twenty-first, twenty-second, twenty-third, twenty-fourth, twenty-fifth, twenty-sixth, twenty-seventh, twenty-eighth, twenty-ninth, thirtieth, thirty-first and thirty-second AND gates, a third output terminal of the third decoder front-end cell is respectively connected to the third input terminals of the thirty-third, thirty-fourth, thirty-fifth, thirty-sixth, thirty-seventh, thirty-eighth, thirty-ninth, fortieth, forty-first, forty-second, forty-third, forty-fourth, forty-fifth, forty-sixth, forty-seventh and forty-eighth AND gates, and a fourth output terminal of the third decoder front-end cell is respectively connected to the third input terminals of the forty-ninth, fiftieth, fifty-first, fifty-second, fifty-third, fifty-fourth, fifty-fifth, fifty-sixth, fifty-seventh, fifty-eighth, fifty-ninth, sixtieth, sixty-first, sixty-second, sixty-third and sixty-fourth AND gates; each decoder front-end cell comprises a first latch, a second latch and four two-input AND gates, the first latch and the second latch each have an input terminal, an enable terminal, an output terminal and an inverted output terminal, the four two-input AND gates each have a first input terminal, a second input terminal and an output terminal, the four two-input AND gates are referred to as a third AND gate, a fourth AND gate, a fifth AND gate and a sixth AND gate respectively, the enable terminal of the first latch and the enable terminal of the second latch are connected and a connecting terminal thereof is the enable terminal of the decoder front-end cell, the input terminal of the first latch and the input terminal of the second latch are used as the two input terminals of the decoder front-end cell, the output terminal of the first latch is respectively connected to the first input terminal of the third AND gate and the first input terminal of the fourth AND gate, the inverted output terminal of the first latch is respectively connected to the first input terminal of the fifth AND gate and the first input terminal of the sixth AND gate, the output terminal of the second latch is respectively connected to the second input terminal of the third AND gate and the second input terminal of the fifth AND gate, the inverted output terminal of the second latch is respectively connected to the second input terminal of the fourth AND gate and the second input terminal of the sixth AND gate, and the output terminals of the four two-input AND gates are used as the four output terminals of the decoder front-end cell.

The 3-bit decoder comprises a third latch, a fourth latch, a fifth latch, a fourth inverter, a fifth inverter, a sixth inverter, a seventh inverter, an eighth inverter, a ninth inverter, a tenth inverter, an eleventh inverter, a twelfth inverter, a twelfth PMOS transistor, a thirteenth PMOS transistor, a fourteenth PMOS transistor, a fifteenth PMOS transistor, a sixteenth PMOS transistor, a seventeenth PMOS transistor, an eighteenth PMOS transistor, a nineteenth PMOS transistor, a fourteenth NMOS transistor, a fifteenth NMOS transistor, a sixteenth NMOS transistor, a seventeenth NMOS transistor, an eighteenth NMOS transistor, a nineteenth NMOS transistor, a twentieth NMOS transistor, a twenty-first NMOS transistor, a twenty-second NMOS transistor, a twenty-third NMOS transistor, a twenty-fourth NMOS transistor, a twenty-fifth NMOS transistor, twenty-sixth NMOS transistor, a twenty-seventh NMOS transistor and a twenty-eighth NMOS transistor, the third latch, the fourth latch and the fifth latch each have an input terminal, an enable terminal, an output terminal and an inverted output terminal, an input terminal of the twelfth inverter, the enable terminal of the third latch, the enable terminal of the fourth latch and the enable terminal of the fifth latch are connected and a connecting terminal thereof is an enable terminal of the 3-bit decoder, to which the first enable control signal EN_L is accessed, the input terminal of the third latch, the input terminal of the fourth latch and the input terminal of the fifth latch form a 3-bit input terminal of the 3-bit decoder, to which 3-bit binary data is input, an output terminal of the twelfth inverter is respectively connected to a gate of the fourteenth NMOS transistor, a gate of the twelfth PMOS transistor, a gate of the thirteenth PMOS transistor, a gate of the fourteenth PMOS transistor, a gate of the fifteenth PMOS transistor, a gate of the sixteenth PMOS transistor, a gate of the seventeenth PMOS transistor, a gate of the eighteenth PMOS transistor and a gate of the nineteenth PMOS transistor, the output terminal of the third latch is respectively connected to a gate of the twenty-second NMOS transistor, a gate of the twenty-fourth NMOS transistor, a gate of the twenty-sixth NMOS transistor and a gate of the twenty-eighth NMOS transistor, the inverted output terminal of the third latch is respectively connected to a gate of the twenty-first NMOS transistor, a gate of the twenty-third NMOS transistor, a gate of the twenty-fifth NMOS transistor and a gate of the twenty-seventh NMOS transistor, the output terminal of the fourth latch is respectively connected to a gate of the eighteenth NMOS transistor and a gate of the twentieth NMOS transistor, the inverted output terminal of the fourth latch is respectively connected to a gate of the seventeenth NMOS transistor and a gate of the nineteenth NMOS transistor, the output terminal of the fifth latch is connected to a gate of the sixteenth NMOS transistor, the inverted output terminal of the fifth latch is connected to a gate of the fifteenth NMOS transistor, a source of the fourteenth NMOS transistor is grounded, a drain of the fourteenth NMOS transistor is respectively connected to a source of the fifteenth NMOS transistor and a source of the sixteenth NMOS transistor, a drain of the fifteenth NMOS transistor is respectively connected to a source of the seventeenth NMOS transistor and a source of the eighteenth NMOS transistor, a drain of the sixteenth NMOS transistor is respectively connected to a source of the nineteenth NMOS transistor and a source of the twentieth NMOS transistor, a drain of the seventeenth NMOS transistor is respectively connected to a source of the twenty-first NMOS transistor and a source of the twenty-second NMOS transistor, a drain of the eighteenth NMOS transistor is respectively connected to a source of the twenty-third NMOS transistor and a source of the twenty-fourth NMOS transistor, a drain of the nineteenth NMOS transistor is respectively connected to a source of the twenty-fifth NMOS transistor and a source of the twenty-sixth NMOS transistor, a drain of the twentieth NMOS transistor is respectively connected to a source of the twenty-seventh NMOS transistor and a source of the twenty-eighth NMOS transistor, a drain of the twenty-first NMOS transistor is respectively connected to a drain of the twelfth PMOS transistor and an input terminal of the fourth inverter, a drain of the twenty-second NMOS transistor is respectively connected to a drain of the thirteenth PMOS transistor and an input terminal of the fifth inverter, a drain of the twenty-third NMOS transistor is respectively connected to a drain of the fourteenth PMOS transistor and an input terminal of the sixth inverter, a drain of the twenty-fourth NMOS transistor is respectively connected to a drain of the fifteenth PMOS transistor and an input terminal of the seventh inverter, a drain of the twenty-fifth NMOS transistor is respectively connected to a drain of the sixteenth PMOS transistor and an input terminal of the eighth inverter, a drain of the twenty-sixth NMOS transistor is respectively connected to a drain of the seventeenth PMOS transistor and an input terminal of the ninth inverter, a drain of the twenty-seventh NMOS transistor is respectively connected to a drain of the eighteenth PMOS transistor and an input terminal of the tenth inverter, a drain of the twenty-eighth NMOS transistor is respectively connected to a drain of the nineteenth PMOS transistor and an input terminal of the eleventh inverter, the supply voltage VDD is accessed to a source of the twelfth PMOS transistor, a source of the thirteenth PMOS transistor, a source of the fourteenth PMOS transistor, a source of the fifteenth PMOS transistor, a source of the sixteenth PMOS transistor, a source of the seventeenth PMOS transistor, a source of the eighteenth PMOS transistor and a source of the nineteenth PMOS transistor, an output terminal of the fourth inverter, an output terminal of the fifth inverter, an output terminal of the sixth inverter, an output terminal of the seventh inverter, an output terminal of the eighth inverter, an output terminal of the ninth inverter, an output terminal of the tenth inverter and an output terminal of the eleventh inverter form a 8-bit output terminal of the 3-bit decoder, which is used for outputting 8-bit binary data.

The transmission gate comprises a thirteenth inverter, a twenty-ninth NMOS transistor and a twentieth PMOS transistor, wherein a drain of the twenty-ninth NMOS transistor and a source of the twentieth PMOS transistor are connected and a connecting terminal thereof is the input terminal of the transmission gate, a source of the twenty-ninth NMOS transistor and a drain of the twentieth PMOS transistor are connected and a connecting terminal thereof is the output terminal of the transmission gate, a gate of the twenty-ninth NMOS transistor and an input terminal of the thirteenth inverter are connected and a connecting terminal thereof is the control terminal of the transmission gate, and an output terminal of the thirteenth inverter is connected to a gate of the twentieth PMOS transistor.

The buffer comprises two inverters, wherein an input terminal of a first inverter is an input terminal of the buffer, an output terminal of a second inverter is an output terminal of the buffer, and an output terminal of the first inverter is connected to an input terminal of the second inverter.

DESCRIPTION OF THE EMBODIMENTS

The invention will be described in further detail below in conjunction with accompanying drawings and embodiments.

Embodiment 1

Figure 1:
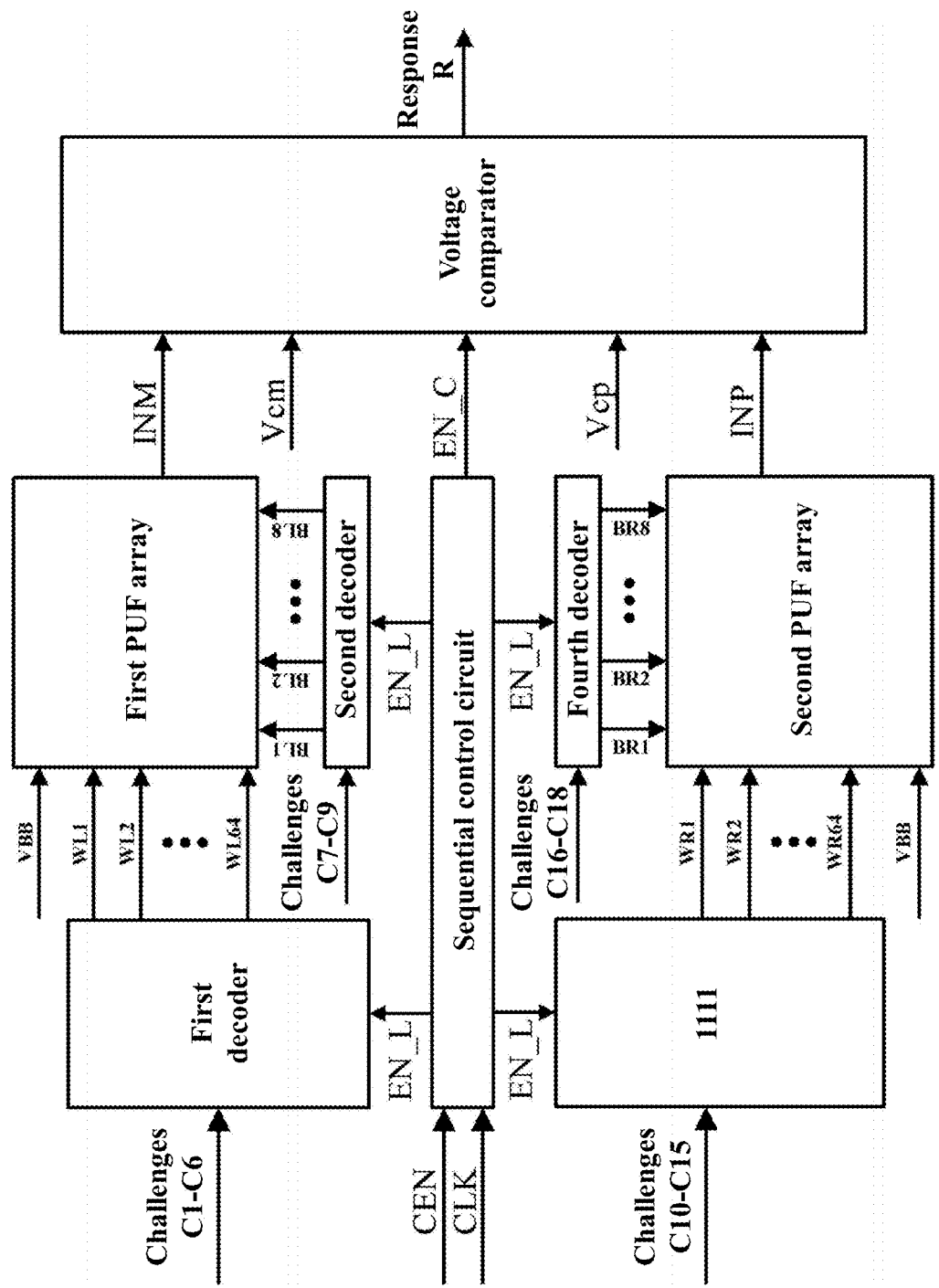
FIG. 1 is a circuit diagram of a voltage mode weak-PUF circuit with rich challenge-response pairs according to the invention.
Figure 2:
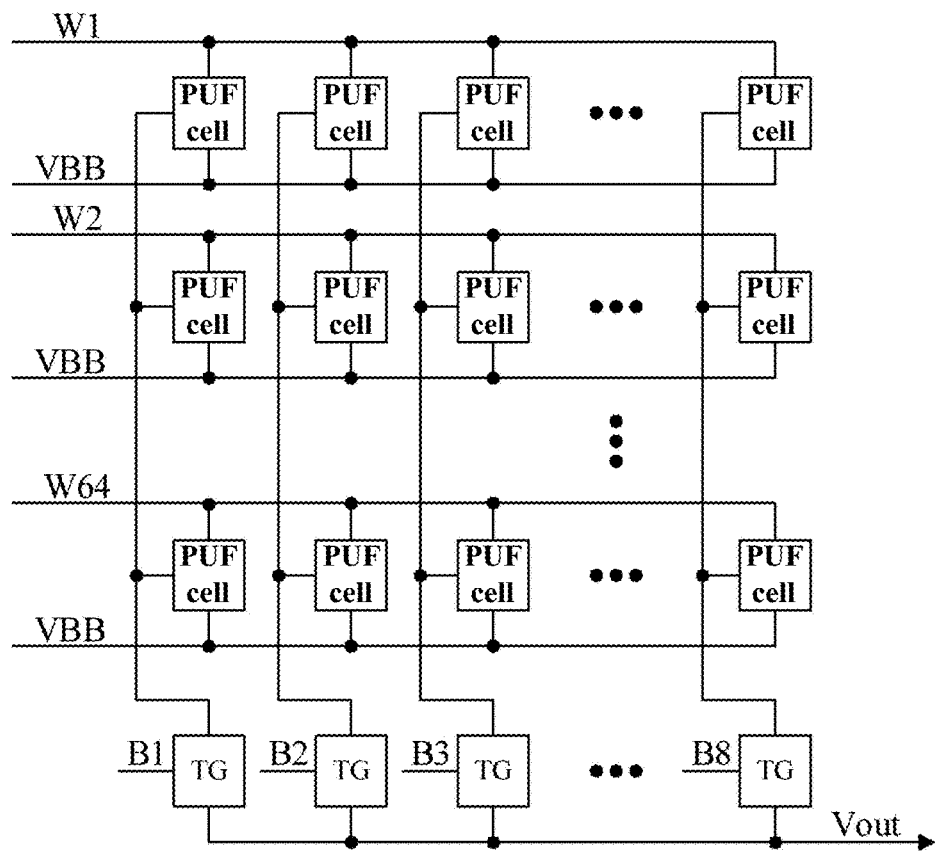
FIG. 2 is a structural diagram of a PUF array of the voltage mode weak-PUF circuit with rich challenge-response pairs according to the invention.
Figure 3:
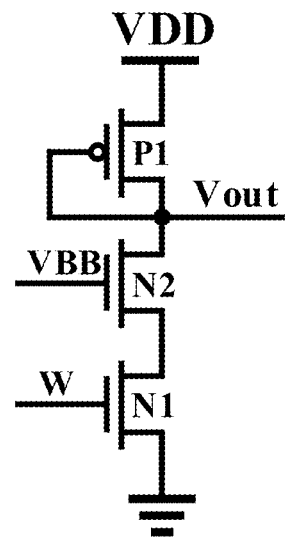
FIG. 3 is a circuit diagram of a PUF cell of the voltage mode weak-PUF circuit with rich challenge-response pairs according to the invention.

As shown in FIG. 1-FIG. 3, a voltage mode weak-PUF circuit with rich challenge-response pairs comprises four decoders, two PUF arrays, a sequential control circuit and a voltage comparator, wherein each PUF array comprises m*n PUF cells and n transmission gates, m is equal to 64, n is equal to 8, the m*n PUF cells are distributed in m rows and n columns, the n transmission gates are distributed in one row and n columns, each transmission gate has a control terminal, an input terminal and an output terminal, each PUF cell has a first input terminal, a second input terminal and an output terminal, and comprises a first PMOS transistor P1, a first NMOS transistor N1 and a second NMOS transistor N2, a supply voltage VDD is accessed to a source of the first PMOS transistor P1, a gate of the first PMOS transistor P1, a drain of the first PMOS transistor P1 and a drain of the second NMOS transistor N2 are connected and a connecting terminal thereof is the output terminal of the PUF cell, a gate of the second NMOS transistor N2 is the second input terminal of the PUF cell, a source of the second NMOS transistor N2 and a drain of the first NMOS transistor N1 are connected, a gate of the first NMOS transistor N1 is the first input terminal of the PUF cell, a source of the first NMOS transistor is grounded, the first PMOS transistor P1, the first NMOS transistor N1 and the second NMOS transistor N2 all adopt the minimum sizes under the TSMC 65 nm process, that is, the width is 120 nm, and the length is 65 nm; in each PUF array, the first input terminals of the n PUF cells in the $j^{th}$ row are connected and a connecting terminal thereof is a $j^{th}$ row address input terminal of the PUF array, j=1, 2, . . . , m, a first row address input terminal to an $m^{th}$ row address input terminal of the PUF array form an m-bit row address input terminal of the PUF array, the second input terminals of the m*n PUF cells are connected and a connecting terminal thereof is a sub-threshold input terminal of the PUF array, to which a sub-threshold voltage VBB is accessed, the control terminal of the $k^{th}$ transmission gate is a $k^{th}$ column address input terminal of the PUF array, k=1, 2, . . . , n, a first column address input terminal to an $n^{th}$ column address input terminal of the PUF array form an n-bit column address input terminal of the PUF array, and the input terminal of the $k^{th}$ transmission gate is connected to the output terminals of the m PUF cells in the $k^{th}$ column; the output terminals of the n transmission gates are connected and a connecting terminal thereof is an output terminal of the PUF array; the two PUF arrays are referred to as a first PUF array and a second PUF array respectively; the sequential control circuit is configured to provide an enable control signal for the four decoders and the voltage comparator to enable the four decoders, the two PUF arrays and the voltage comparator to operate cooperatively in a preset sequence; the four decoders are referred to a first decoder, a second decoder, a third decoder and a fourth decoder respectively; a first row selection signal is accessed to the first decoder and is converted by the first decoder into a first m-bit row address signal, which is output to the m-bit row address input terminal of the first PUF array, a first column selection signal is accessed to the second decoder and is converted by the second decoder into a first n-bit column address signal, which is output to the nm column address input terminal of the first PUF array, the first m-bit row address signal is used for selecting n PUF cells in one row of the first PUF array to enable the n PUF cells in said row to enter an operating state to generate output signals, the first n-bit column address signal is used for selecting one PUF cell from the n selected PUF cells in said row of the first PUF array and outputting an output signal generated by the selected PUF cell to the voltage comparator, as an output signal of the first PUF array, a second row selection signal is accessed to the third decoder and is converted by the third decoder into a second m-bit row address signal, which is output to the m-bit row address input terminal of the second PUF array, a second column selection signal is accessed to the fourth decoder and is converted by the fourth decoder into a second n-bit column address signal, which is output to the n-bit column address input terminal of the second PUF array, the second m-bit row address signal is used for selecting n PUF cells in one row of the second PUF array to enable the n PUF cells in said row to enter an operating state to generate output signals, the second n-bit column address signal is used for selecting one PUF cells from the n selected PUF cells in the second PUF array and outputting an output signal generated by the selected PUF cell to the voltage comparator, as an output signal of the second PUF array, and the voltage comparator is configured to compare the two output signals output thereto by the first PUF array and the second PUF array to obtain and output a response signal.

In this embodiment, the first decoder and the second decoder are both 6-bit decoders and are able to convert 6-bit binary data output thereto into 64-bit binary data and output the 64-bit binary data, the second decoder and the fourth decoder are both 3-bit decoders and are able to convert 3-bit binary data output thereto into 8-bit binary data and output the 8-bit binary data, the first row selection signal and the second row selection signal are both 6-bit binary data, and the first column selection signal and the second column selection signal are both 3-bit binary data; the sequential control circuit generates a first enable control signal EN_L and a second enable control signal EN_C, wherein the first enable control signal EN_L is output to the first decoder, the second decoder, the third decoder and the fourth decoder respectively, and the second enable control signal EN_C is output to the voltage comparator; when the first enable control signal EN_L is a high level, the first decoder and the third decoder operate to perform decoding, and the second decoder and the fourth decoder do not operate and hold the current state; when the first enable controls signal EN_L is a low level, the first decoder and the third decoder do not operate and hold the current state, and the second decoder and the fourth decoder operate to perform decoding; when the second enable control signal EN_C is a high level, the voltage comparator operates to compare the output signals output thereto by the two PUF arrays to obtain and output the response signal; and when the second enable control signal EN_C is a low level, the voltage comparator is turned off, and no valid value is output via an output terminal of the voltage comparator.

Embodiment 2

Figure 4:
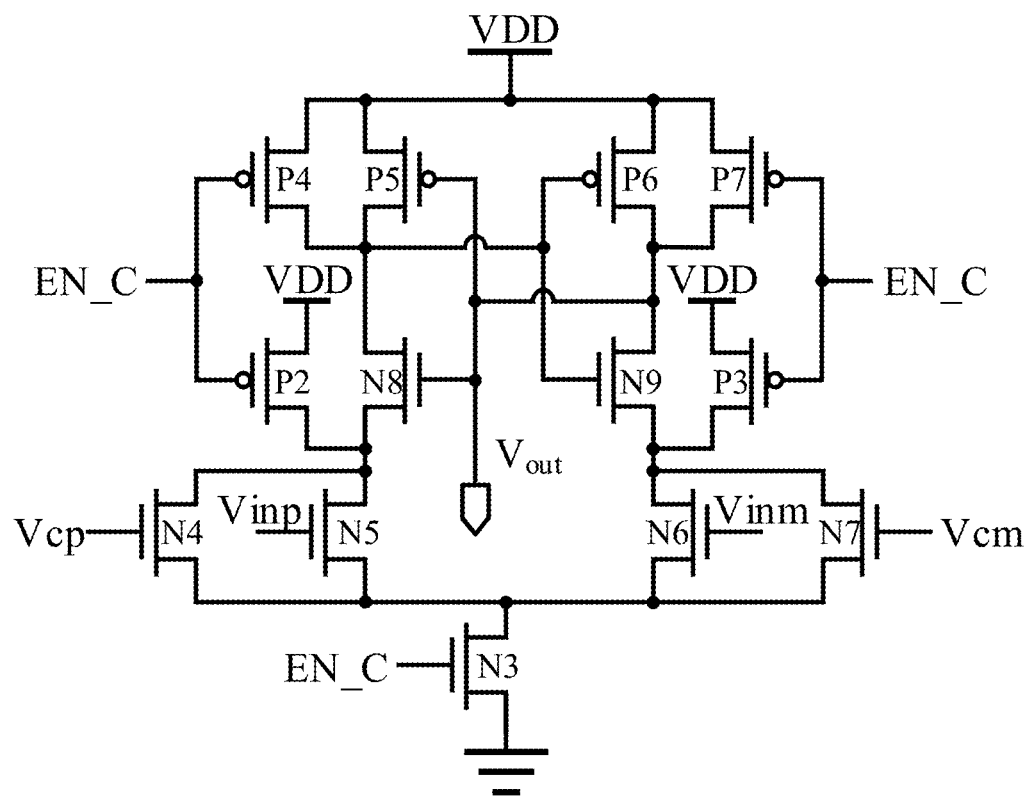
FIG. 4 is a circuit diagram of a voltage comparator of the voltage mode weak-PUF circuit with rich challenge-response pairs according to the invention.

This embodiment is basically the same as Embodiment 1, and differs from Embodiment 1 in the following aspects: in this embodiment, as shown in FIG. 4, the voltage comparator has a first input terminal, a second input terminal, an enable terminal, a first calibration terminal, a second calibration terminal and an output terminal, wherein the first input terminal of the voltage comparator is connected to the output terminal of the first PUF array, the second input terminal of the voltage comparator is connected to the output terminal of the second PUF array, the enable terminal of the voltage comparator is connected to the sequential control circuit and allows the second enable control signal ENC to be accessed thereto, a first calibration voltage Vcm is accessed to the first calibration terminal of the voltage comparator, a second calibration voltage Vcp is accessed to the second calibration terminal of the voltage comparator, and the first calibration voltage Vcm and the second calibration voltage Vcp are used for enabling the proportion of response signals 0/1 output by the output terminal of the voltage comparator to be close to a desired value 50%; the voltage comparator comprises a second PMOS transistor P2, a third PMOS transistor P3, a fourth PMOS transistor P4, a fifth PMOS transistor P5, a sixth PMOS transistor P6, a seventh PMOS transistor P7, a third NMOS transistor N3, a fourth NMOS transistor N4, a fifth NMOS transistor N5, a sixth NMOS transistor N6, a seventh NMOS transistor N7, an eighth NMOS transistor N8 and a ninth NMOS transistor N9, the supply voltage VDD is accessed to a source of the second PMOS transistor P2, a source of the third PMOS transistor P3, a source of the fourth PMOS transistor P4, a source of the fifth PMOS transistor P5, a source of the sixth PMOS transistor P6 and a source of the seventh PMOS transistor P7, a gate of the second PMOS transistor P2, a gate of the fourth PMOS transistor P4, a gate of the third PMOS transistor P3, a gate of the third NMOS transistor N3 and a gate of the seventh PMOS transistor P7 are connected and a connecting terminal thereof is the enable terminal of the voltage comparator, a drain of the second PMOS transistor P2, a source of the eighth NMOS transistor N8, a drain of the fourth NMOS transistor N4 and a drain of the fifth NMOS transistor N5 are connected, a drain of the third PMOS transistor P3, a source of the ninth NMOS transistor N9, a drain of the sixth NMOS transistor N6 and a drain of the seventh NMOS transistor N7 are connected, a drain of the fourth PMOS transistor P4, a drain of the fifth PMOS transistor P5, a drain of the eighth NMOS transistor N8, a gate of the sixth PMOS transistor P6 and a gate of the ninth NMOS transistor N9 are connected, a gate of the fifth PMOS transistor P5, a gate of the eighth NMOS transistor N8, a drain of the sixth PMOS transistor P6, a drain of the seventh PMOS transistor P7 and a drain of the ninth NMOS transistor N9 are connected and a connecting terminal thereof is the output terminal of the voltage comparator, a source of the third NMOS transistor N3 is grounded, a drain of the third NMOS transistor N3, a drain of the fourth NMOS transistor N4, a drain of the fifth NMOS transistor N5, a drain of the sixth NMOS transistor N6 and a drain of the seventh NMOS transistor N7 are connected, a gate of the fourth NMOS transistor N4 is the second calibration terminal of the voltage comparator, a gate of the fifth NMOS transistor N5 is the second input terminal of the voltage comparator, a gate of the sixth NMOS transistor N6 is the first input terminal of the voltage comparator, and a gate of the seventh NMOS transistor N7 is the first calibration terminal of the voltage comparator.

In the voltage comparator in this embodiment, the first calibration voltage Vcm is applied to the gate of the seventh NMOS transistor N7 and the second calibration voltage Vcp is applied to the gate of the fourth NMOS transistor N4 to keep the currents across the two ends of the voltage comparator in balance to eliminate a process deviation of the voltage comparator, and under a desired condition, the voltage comparator will not exert an influence on the proportion of response signals 0/1 (level signals) output via the output terminal of the voltage comparator, that is, the proportion of response signals 0/1 is 50%. However, in actual application, due to the process deviation of the voltage comparator, the proportion of response signals 0/1 will inevitably deviate from 50%. When the proportion of 0/1 is larger, for example, when the probability that a level output via the output terminal of the voltage comparator is 0 is greater than the probability that the level output via the output terminal of the voltage comparator is 1, that is, there is a large probability that the current across the eighth NMOS transistor N8 is less than the current across the ninth NMOS transistor N9, the second calibration voltage Vcp can be increased while the first calibration voltage Vcm is maintained, to increase the current across the eighth NMOS transistor N8, so as to reduce the probability that the level output via the output terminal of the voltage comparator is 0; otherwise, the first calibration voltage Vcm can be increased while the second calibration voltage Vcp is maintained, to increase the current across the ninth NMOS transistor N9, so as to reduce the probability that the level output via the output terminal of the voltage comparator is 1. In this way, before actual operation of the PUF circuit, the voltage comparator can be calibrated multiple times by adjusting the first calibration voltage Vcm and the second calibration voltage Vc. When the probability that the level output via the output terminal of the voltage comparator is 0/1 is close to a desired value (50%), the first calibration voltage Vcm accessed to the first calibration terminal of the voltage comparator and the second calibration voltage Vcp accessed to the second calibration terminal of the voltage comparator are fixed and remain unchanged in subsequent operation of the PUF circuit, thus eliminating the influence of the process deviation of the voltage comparator on output response signals and guaranteeing the randomness and uniqueness of the response signals. When the second enable control signal ENS is a low level, the third NMOS transistor N3 is in an off-state, the entire circuit of the voltage comparator has no gated branch, the fourth PMOS transistor P4, the fifth PMOS transistor P5, the sixth PMOS transistor P6 and the seventh PMOS transistor P7 are in an off-state, the output terminal of the voltage comparator outputs a high level, and the voltage comparator is in an off-state. When the second enable control signal EN_C is a high level, the third NMOS transistor N3 is turned on, at this moment, there is a voltage difference between a voltage signal Vinm input to the first input terminal of the voltage comparator (output signal of the first PUF array) and a voltage signal Vinp input to the second input terminal of the voltage comparator (output signal of the second PUF array) due to the process deviation, leading to a difference between the current across the NMOS transistor N5 and the current cross the sixth NMOS transistor N6, at this moment, a feedback structure formed by the eighth NMOS transistor N8, the ninth NMOS transistor N9, the fifth PMOS transistor P5 and the sixth PMOS transistor P6 quickly amplifies the difference between the voltage signal Vinm and the voltage signal Vinp, and finally, a stable response signal is obtained and output via the output terminal of the voltage comparator.

Embodiment 3

Figure 5:
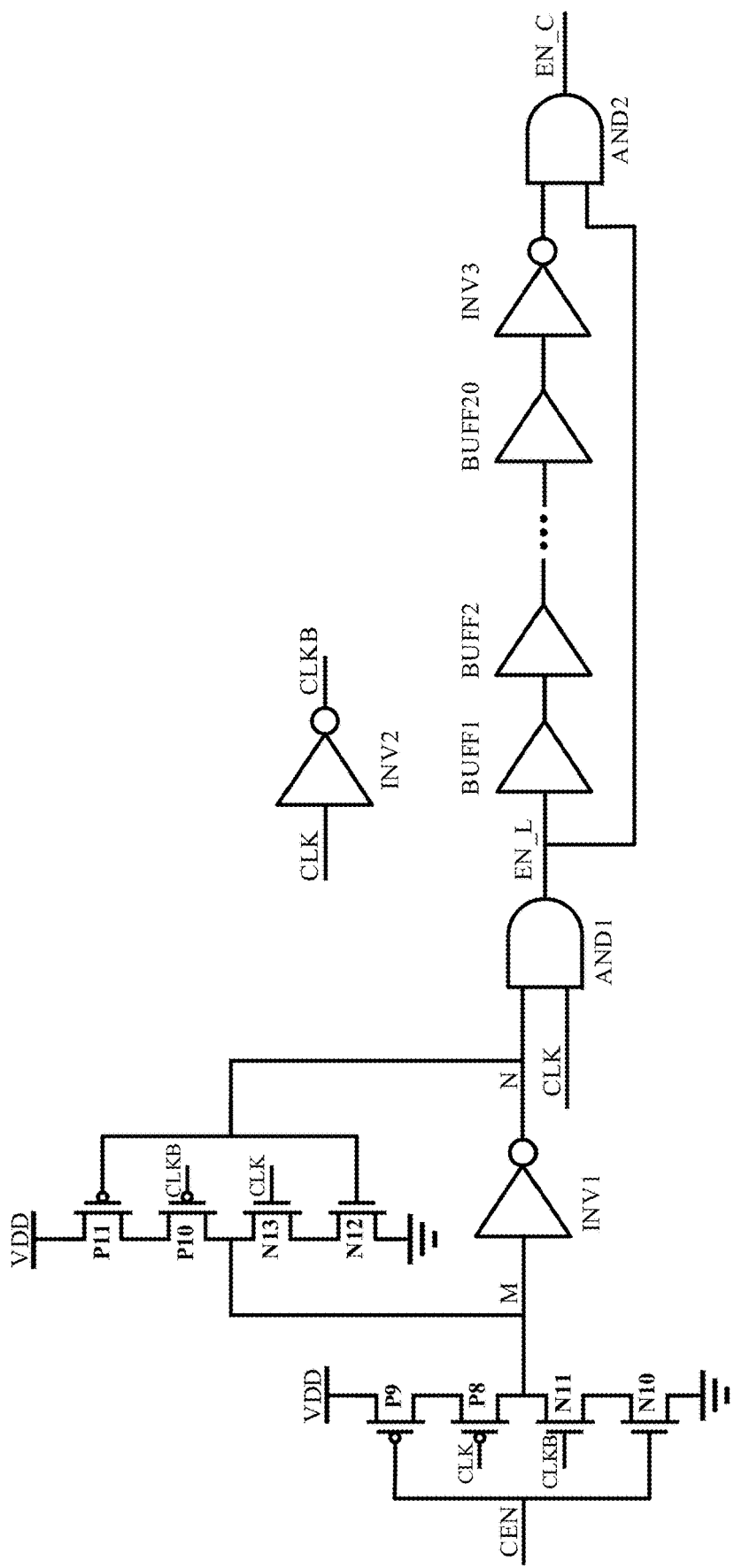
FIG. 5 is a circuit diagram of a sequential control circuit of the voltage mode weak-PUF circuit with rich challenge-response pairs according to the invention.

This embodiment is basically the same as Embodiment 2, and differs from Embodiment 2 in the following aspects: in this embodiment, as shown in FIG. 5, the sequential control circuit comprises an eighth PMOS transistor P8, a ninth PMOS transistor P9, a tenth PMOS transistor P10, an eleventh PMOS transistor P11, a tenth NMOS transistor N10, an eleventh NMOS transistor N11, a twelfth NMOS transistor N12, a thirteenth NMOS transistor N13, a first inverter INV1, a second inverter INV2, a third inverter INV3, two two-input AND gates and a delay cells, wherein each two-input AND gate has a first input terminal, a second input terminal and an output terminal, the two two-input AND gates are referred to a first AND gate AND1 and a second AND gate AND2 respectively, the delay cell is formed by multiple buffers connected in series and has an input terminal and an output terminal, the supply voltage VDD is accessed to a source of the ninth PMOS transistor P9 and a source of the eleventh PMOS transistor P11, a gate of the ninth PMOS transistor P9 and a gate of the tenth NMOS transistor N10 are connected and a connecting terminal thereof is an enable terminal of the sequential control circuit, to which an enable signal CEN is accessed, a drain of the ninth PMOS transistor P9 and a source of the eighth PMOS transistor P8 are connected, a gate of the eighth PMOS transistor P8, a gate of the thirteenth NMOS transistor N13, the second input terminal of the first AND gate AND1 and an input terminal of the second inverter INV2 are connected and a connecting terminal thereof is a clock terminal of the sequential control circuit, to which a clock signal CLK is accessed, a drain of the eighth PMOS transistor P8, a drain of the eleventh NMOS transistor N11, a drain of the tenth PMOS transistor P10, a drain of the thirteenth NMOS transistor N13 and an input terminal of the first inverter INV1, a gate of the eleventh NMOS transistor N11, a gate of the tenth PMOS transistor P10 and an output terminal of the second inverter INV2 are connected, a source of the eleventh NMOS transistor N11 and a drain of the tenth NMOS transistor N10 are connected, a source of the tenth NMOS transistor N10 is grounded, a gate of the eleventh PMOS transistor P11, a gate of the twelfth NMOS transistor N12, an output terminal of the first inverter INV1 and the first input terminal of the first AND gate AND1 are connected, a drain of the eleventh PMOS transistor P11 and a source of the tenth PMOS transistor P10 are connected, a source of the thirteenth NMOS transistor N13 and a drain of the twelfth NMOS transistor N12 are connected, a source of the twelfth NMOS transistor N12 is grounded, the output terminal of the first AND gate AND1, the input terminal of the delay cell and the second input terminal of the second AND gate AND2 are connected and a connecting terminal thereof is a first output terminal of the sequential control circuit, which is used for outputting the first enable control signal EN_L, the output terminal of the delay cell is connected to an input terminal of the third inverter INV3, an output terminal of the third inverter INV3 is connected to the first input terminal of the second AND gate AND2, and the output terminal of the second AND gate AND2 is a second output terminal of the sequential control circuit, which is used for outputting the second enable control signal EN_C.

In this embodiment, the delay cell is formed by 20 buffers BUFF1-BUFF20 connected in series, wherein an input terminal of a first buffer BUFF1 is the input terminal of the delay cell, an output terminal of a twentieth buffer BUFF20 is the output terminal of the delay cell, an output terminal of a $d^{th}$ buffer BUFFd is an input terminal of a $(d+1)^{th}$ buffer BUFF(d+1), and d=1, 2, . . . , 19.

In the sequential control circuit in this embodiment, when the enable signal CEN is a low level, the ninth PMOS transistor P9 is in an on-state, the tenth NMOS transistor N10 is in an off-state, a node M has no gated branch and is maintained at a high level, the high level of the node M is inverted by the first inverter INV1, then the node N is maintained at a low level, and at this moment, the sequential control circuit is no longer controlled by the clock signal CLK; when the enable signal CEN is a high level, the ninth PMOS transistor P9 is in an off-state, the tenth NMOS transistor N10 is in an on-state, at this moment, under the action of the feedback structure formed by the tenth NMOS transistor N10, the eleventh NMOS transistor N11, the twelfth NMOS transistor N12, the thirteenth NMOS transistor N13, the eighth PMOS transistor P8, the ninth PMOS transistor P9, the tenth PMOS transistor P10, the eleventh PMOS transistor P11 and the first inverter INV1, the level of a node N will not change instantly with the change of the enable signal CEN and will turn into a high level when the clock signal CLK jumps, thus guaranteeing the integrity of the clock signal CLK; the second enable control signal ENS is generated after the first enable control signal EN_L passes through the delay cell, the third inverter INV3 and the second AND gate AND2, and when the first enable control signal EN_L turns from a low level to a high level, the pulse width of the second enable control signal EN_C will be determined by a delay of the multiple buffers, thus guaranteeing that the voltage comparator will not work until it obtains stable output signals from the two PUF arrays; and because the determination stage of the voltage comparator is short, power of the voltage comparator can be reduced.

Embodiment 4

Figure 6:
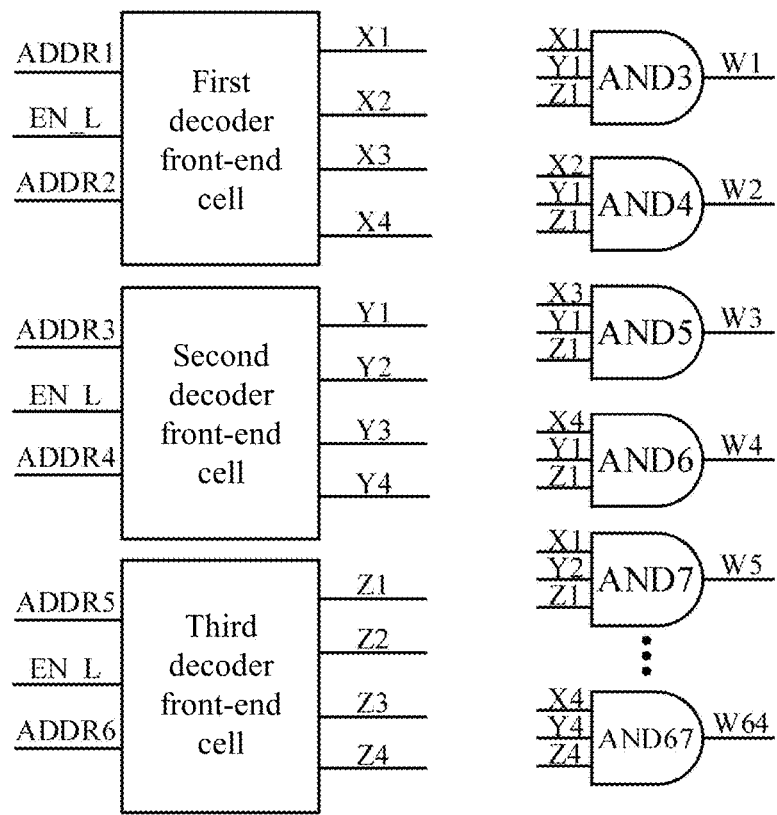
FIG. 6 is a circuit diagram of a 6-bit decoder of the voltage mode weak-PUF circuit with rich challenge-response pairs according to the invention.
Figure 7:
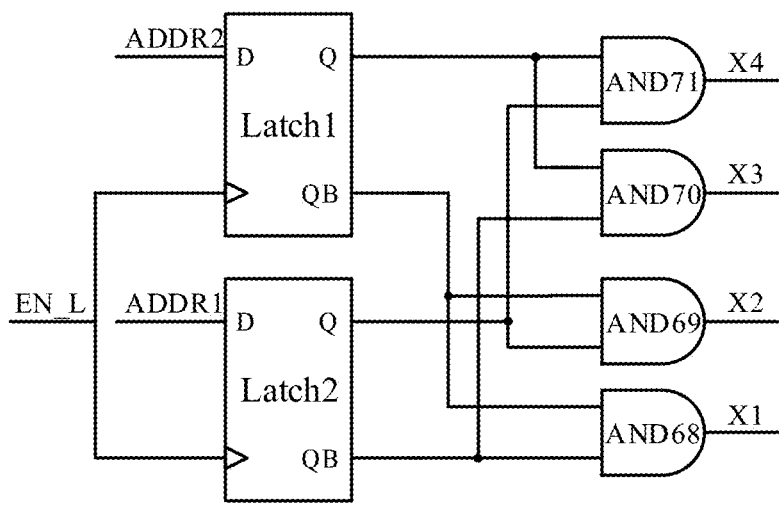
FIG. 7 is a circuit diagram of a latch of the voltage mode weak-PUF circuit with rich challenge-response pairs according to the invention.

This embodiment is basically the same as Embodiment 3, and differs from Embodiment 3 in the following aspects: in this embodiment, as shown in FIG. 6 and FIG. 7, the 6-bit decoder comprises three decoder front-end cells and 64 three-input AND gates, wherein each three-input AND gate has a first input terminal, a second input terminal, a third input terminal and an output terminal, the 64 three-input AND gates are referred to a first AND gate to a sixty-fourth AND gate AND3-AND67 respectively, each decoder front-end cell has an enable terminal, two input terminals and four output terminals, and the three decoder front-end cells are referred to a first decoder front-end cell, a second decoder front-end cell and a third decoder front-end cell respectively; the enable terminals of the three decoder front-end cells are connected and a connecting terminal thereof is an enable terminal of the 6-bit decoder, to which the first enable control signal EN_L is accessed, the two input terminals of the first decoder front-end cell, the two input terminals of the second decoder front-end cell and the two input terminals of the third decoder front-end cell form a 6-bit input terminal of the 6-bit decoder, to which 6-bit binary data is accessed, the output terminals of the first AND gate to the sixty-fourth AND gate AND3-AND67 form a 64-bit output terminal of the 6-bit decoder, which is used for outputting 64-bit binary data, the four output terminals of the first decoder front-end cell are respectively connected to the first input terminals of the first, second, third and fourth AND gates, the first input terminals of the fifth, sixth, seventh and eighth AND gates, the first input terminals of the ninth, tenth, eleventh and twelfth AND gates, the first input terminals of the thirteenth, fourteenth, fifteenth and sixteenth AND gates, the first input terminals of the seventeenth, eighteenth, nineteenth and twentieth AND gates, the first input terminals of the twenty-first, twenty-second, twenty-third and twenty-fourth AND gates, the first input terminals of the twenty-fifth, twenty-sixth, twenty-seventh and twenty-eighth AND gates, the first input terminals of the twenty-ninth, thirtieth, thirty-first and thirty-second AND gates, the first input terminals of the thirty-third, thirty-fourth, thirty-fifth and thirty-sixth AND gates, the first input terminals of the thirty-seventh, thirty-eighth, thirty-ninth and fortieth AND gates, the first input terminals of the forty-first, forty-second, forty-third and forty-fourth AND gates, the first input terminals of the forty-fifth, forty-sixth, forty-seventh and forty-eighth AND gates, the first input terminals of the forty-ninth, fiftieth, fifty-first and fifty-second AND gates, the first input terminals of the fifty-third, fifty-fourth, fifty-fifth and fifty-sixth AND gates, the first input terminals of the fifty-seventh, fifty-eighth, fifty-ninth and sixtieth AND gates, and the first input terminals of the sixty-first, sixty-second, sixty-third and sixty-fourth AND gates in a one-to-one corresponding manner, a first output terminal of the second decoder front-end cell is respectively connected to the second input terminals of the first, second, third and fourth AND gates, the second input terminals of the seventeenth, eighteenth, nineteenth and twentieth AND gates, the second input terminals of the thirty-third, thirty-fourth, thirty-fifth and thirty-sixth AND gates, the second input terminals of the forty-ninth, fiftieth, fifty-first and fifty-second AND gates, and the second input terminals of the fifty-third, fifty-fourth, fifty-fifth and fifty-sixth AND gates, a third output terminal of the second decoder front-end cell is respectively connected to the second input terminals of the ninth, tenth, eleventh and twelfth AND gates, the second input terminals of the twenty-fifth, twenty-sixth, twenty-seventh and twenty-eighth AND gates, the second input terminals of the forty-first, forty-second, forty-third and forty-fourth AND gates, and the second input terminals of the fifty-seventh, fifty-eighth, fifty-ninth and sixtieth AND gates, a fourth output terminal of the second decoder front-end cell is respectively connected to the second input terminals of the thirteenth, fourteenth, fifteenth and sixteenth AND gates, the second input terminals of the twenty-ninth, thirtieth, thirty-first and thirty-second AND gates, the second input terminals of the forty-fifth, forty-sixth, forty-seventh and forty-eighth AND gates, and the second input terminals of the sixty-first, sixty-second, sixty-third and sixty-fourth AND gates, a first output terminal of the third decoder front-end cell is respectively connected to the third input terminals of the first, second, third, fourth, fifth, sixth, seventh, eighth, ninth, tenth, eleventh, twelfth, thirteenth, fourteenth, fifteenth and sixteenth AND gates, a second output terminal of the third decoder front-end cell is respectively connected to the third input terminals of the seventeenth, eighteenth, nineteenth, twentieth, twenty-first, twenty-second, twenty-third, twenty-fourth, twenty-fifth, twenty-sixth, twenty-seventh, twenty-eighth, twenty-ninth, thirtieth, thirty-first and thirty-second AND gates, a third output terminal of the third decoder front-end cell is respectively connected to the third input terminals of the thirty-third, thirty-fourth, thirty-fifth, thirty-sixth, thirty-seventh, thirty-eighth, thirty-ninth, fortieth, forty-first, forty-second, forty-third, forty-fourth, forty-fifth, forty-sixth, forty-seventh and forty-eighth AND gates, and a fourth output terminal of the third decoder front-end cell is respectively connected to the third input terminals of the forty-ninth, fiftieth, fifty-first, fifty-second, fifty-third, fifty-fourth, fifty-fifth, fifty-sixth, fifty-seventh, fifty-eighth, fifty-ninth, sixtieth, sixty-first, sixty-second, sixty-third and sixty-fourth AND gates; each decoder front-end cell comprises a first latch Latch1, a second latch Latch2 and four two-input AND gates, the first latch Latch1 and the second latch Latch2 each have an input terminal, an enable terminal, an output terminal and an inverted output terminal, the four two-input AND gates each have a first input terminal, a second input terminal and an output terminal, the four two-input AND gates are referred to as a third AND gate AND71, a fourth AND gate AND70, a fifth AND gate AND69 and a sixth AND gate AND68 respectively, the enable terminal of the first latch Latch1 and the enable terminal of the second latch Latch2 are connected and a connecting terminal thereof is the enable terminal of the decoder front-end cell, the input terminal of the first latch Latch1 and the input terminal of the second latch Latch2 are used as the two input terminals of the decoder front-end cell, the output terminal of the first latch Latch1 is respectively connected to the first input terminal of the third AND gate AND71 and the first input terminal of the fourth AND gate AND70, the inverted output terminal of the first latch Latch1 is respectively connected to the first input terminal of the fifth AND gate AND69 and the first input terminal of the sixth AND gate AND68, the output terminal of the second latch Latch2 is respectively connected to the second input terminal of the third AND gate AND71 and the second input terminal of the fifth AND gate AND69, the inverted output terminal of the second latch Latch2 is respectively connected to the second input terminal of the fourth AND gate AND70 and the second input terminal of the sixth AND gate AND68, and the output terminals of the four two-input AND gates are used as the four output terminals of the decoder front-end cell.

Figure 8:
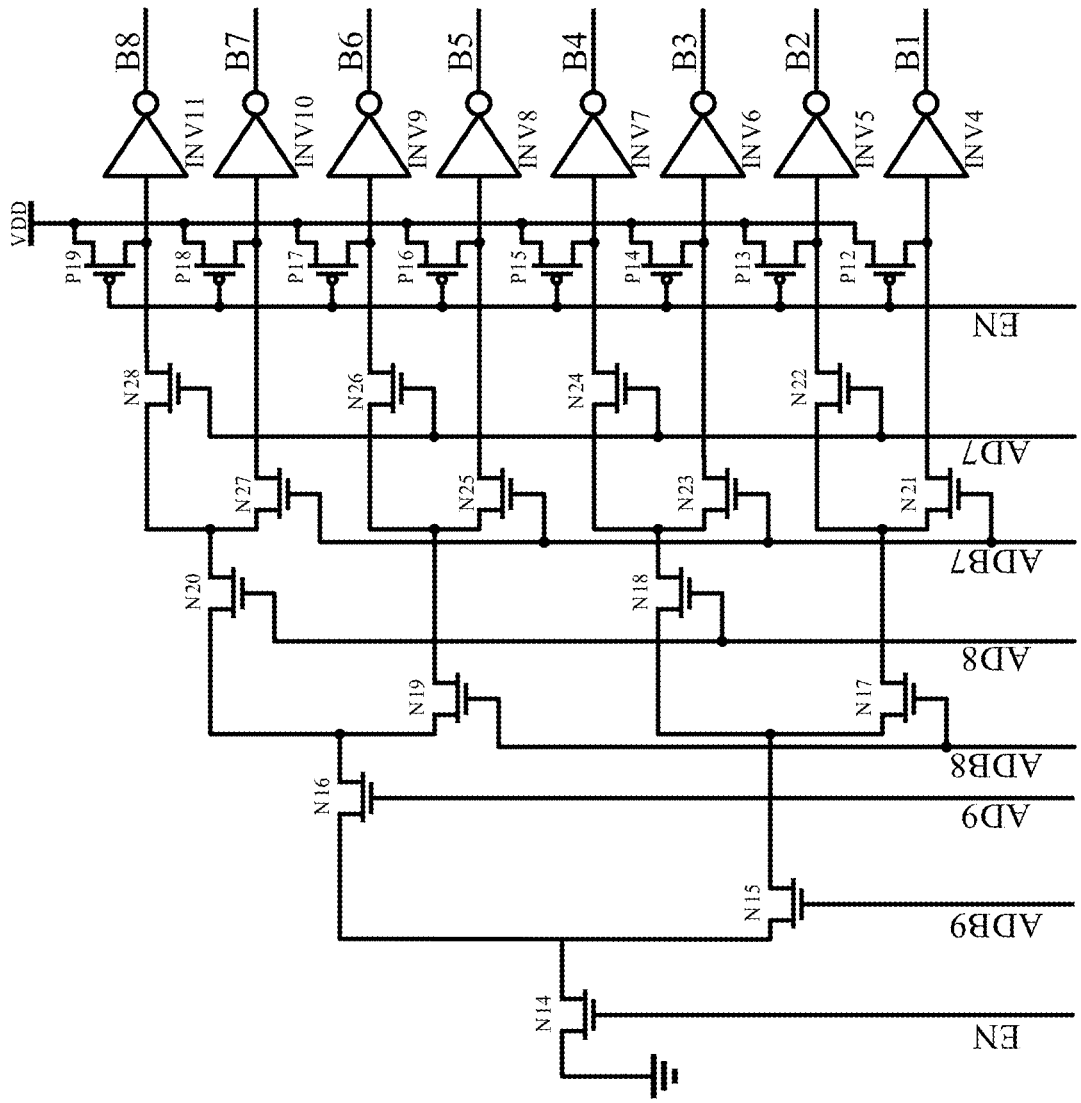
FIG. 8 is a circuit diagram of a 3-bit decoder of the voltage mode weak-PUF circuit with rich challenge-response pairs according to the invention.
Figure 8:
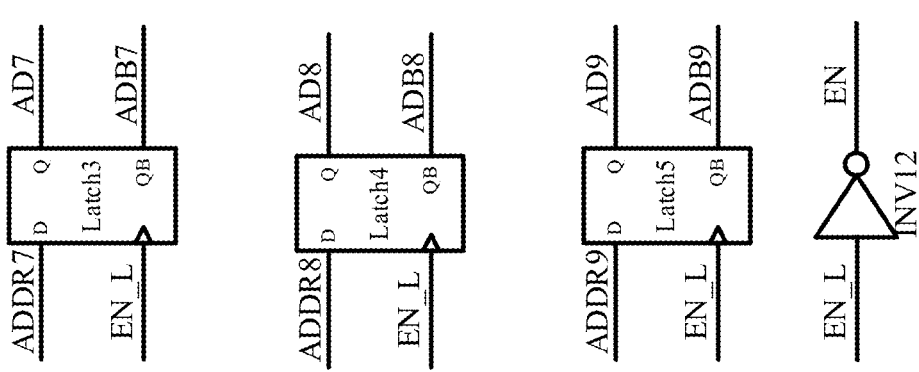

In this embodiment, as shown in FIG. 8, the 3-bit decoder comprises a third latch Latch3, a fourth latch Latch4, a fifth latch Latch5, a fourth inverter INV4, a fifth inverter INV5, a sixth inverter INV6, a seventh inverter INV7, an eighth inverter INV9, a ninth inverter INV9, a tenth inverter INV10, an eleventh inverter INV11, a twelfth inverter INV12, a twelfth PMOS transistor P12, a thirteenth PMOS transistor P13, a fourteenth PMOS transistor P14, a fifteenth PMOS transistor P15, a sixteenth PMOS transistor P16, a seventeenth PMOS transistor P17, an eighteenth PMOS transistor P18, a nineteenth PMOS transistor P19, a fourteenth NMOS transistor N14, a fifteenth NMOS transistor N15, a sixteenth NMOS transistor N16, a seventeenth NMOS transistor N17, an eighteenth NMOS transistor N18, a nineteenth NMOS transistor N19, a twentieth NMOS transistor N20, a twenty-first NMOS transistor N21, a twenty-second NMOS transistor N22, a twenty-third NMOS transistor N23, a twenty-fourth NMOS transistor N24, a twenty-fifth NMOS transistor N25, twenty-sixth NMOS transistor N26, a twenty-seventh NMOS transistor N27 and a twenty-eighth NMOS transistor n28, the third latch Latch3, the fourth latch Latch4 and the fifth latch Latch5 each have an input terminal, an enable terminal, an output terminal and an inverted output terminal, an input terminal of the twelfth inverter INV12, the enable terminal of the third latch Latch3, the enable terminal of the fourth latch Latch4 and the enable terminal of the fifth latch Latch5 are connected and a connecting terminal thereof is an enable terminal of the 3-bit decoder, to which the first enable control signal EN_L is accessed, the input terminal of the third latch Latch3, the input terminal of the fourth latch Latch4 and the input terminal of the fifth latch Latch5 form a 3-bit input terminal of the 3-bit decoder, to which 3-bit binary data is accessed, an output terminal of the twelfth inverter INV12 is respectively connected to a gate of the fourteenth NMOS transistor N14, a gate of the twelfth PMOS transistor P12, a gate of the thirteenth PMOS transistor P13, a gate of the fourteenth PMOS transistor P14, a gate of the fifteenth PMOS transistor P15, a gate of the sixteenth PMOS transistor P16, a gate of the seventeenth PMOS transistor P17, a gate of the eighteenth PMOS transistor P18 and a gate of the nineteenth PMOS transistor P19, the output terminal of the third latch Latch3 is respectively connected to a gate of the twenty-second NMOS transistor N22, a gate of the twenty-fourth NMOS transistor N24, a gate of the twenty-sixth NMOS transistor N26 and a gate of the twenty-eighth NMOS transistor N28, the inverted output terminal of the third latch Latch3 is respectively connected to a gate of the twenty-first NMOS transistor N21, a gate of the twenty-third NMOS transistor N23, a gate of the twenty-fifth NMOS transistor N25 and a gate of the twenty-seventh NMOS transistor N27, the output terminal of the fourth latch Latch4 is respectively connected to a gate of the eighteenth NMOS transistor N18 and a gate of the twentieth NMOS transistor N20, the inverted output terminal of the fourth latch Latch4 is respectively connected to a gate of the seventeenth NMOS transistor N17 and a gate of the nineteenth NMOS transistor N19, the output terminal of the fifth latch Latch5 is connected to a gate of the sixteenth NMOS transistor N16, the inverted output terminal of the fifth latch Latch5 is connected to a gate of the fifteenth NMOS transistor N15, a source of the fourteenth NMOS transistor N14 is grounded, a drain of the fourteenth NMOS transistor N14 is respectively connected to a source of the fifteenth NMOS transistor N15 and a source of the sixteenth NMOS transistor N16, a drain of the fifteenth NMOS transistor N15 is respectively connected to a source of the seventeenth NMOS transistor N17 and a source of the eighteenth NMOS transistor N18, a drain of the sixteenth NMOS transistor N16 is respectively connected to a source of the nineteenth NMOS transistor N19 and a source of the twentieth NMOS transistor N20, a drain of the seventeenth NMOS transistor N17 is respectively connected to a source of the twenty-first NMOS transistor N21 and a source of the twenty-second NMOS transistor N22, a drain of the eighteenth NMOS transistor N18 is respectively connected to a source of the twenty-third NMOS transistor N23 and a source of the twenty-fourth NMOS transistor N24, a drain of the nineteenth NMOS transistor N19 is respectively connected to a source of the twenty-fifth NMOS transistor N25 and a source of the twenty-sixth NMOS transistor N26, a drain of the twentieth NMOS transistor N20 is respectively connected to a source of the twenty-seventh NMOS transistor N27 and a source of the twenty-eighth NMOS transistor N28, a drain of the twenty-first NMOS transistor N21 is respectively connected to a drain of the twelfth PMOS transistor P12 and an input terminal of the fourth inverter INV4, a drain of the twenty-second NMOS transistor N22 is respectively connected to a drain of the thirteenth PMOS transistor P13 and an input terminal of the fifth inverter INV5, a drain of the twenty-third NMOS transistor N23 is respectively connected to a drain of the fourteenth PMOS transistor P14 and an input terminal of the sixth inverter INV6, a drain of the twenty-fourth NMOS transistor N24 is respectively connected to a drain of the fifteenth PMOS transistor P15 and an input terminal of the seventh inverter INV7, a drain of the twenty-fifth NMOS transistor N25 is respectively connected to a drain of the sixteenth PMOS transistor P16 and an input terminal of the eighth inverter INV8, a drain of the twenty-sixth NMOS transistor N26 is respectively connected to a drain of the seventeenth PMOS transistor P17 and an input terminal of the ninth inverter INV9, a drain of the twenty-seventh NMOS transistor N27 is respectively connected to a drain of the eighteenth PMOS transistor P18 and an input terminal of the tenth inverter INV10, a drain of the twenty-eighth NMOS transistor N28 is respectively connected to a drain of the nineteenth PMOS transistor P19 and an input terminal of the eleventh inverter INV11, the supply voltage VDD is accessed to a source of the twelfth PMOS transistor P12, a source of the thirteenth PMOS transistor P13, a source of the fourteenth PMOS transistor P14, a source of the fifteenth PMOS transistor P15, a source of the sixteenth PMOS transistor P16, a source of the seventeenth PMOS transistor P17, a source of the eighteenth PMOS transistor P18 and a source of the nineteenth PMOS transistor P19, an output terminal of the fourth inverter INV4, an output terminal of the fifth inverter INV5, an output terminal of the sixth inverter INV6, an output terminal of the seventh inverter INV7, an output terminal of the eighth inverter INV8, an output terminal of the ninth inverter INV9, an output terminal of the tenth inverter INV10 and an output terminal of the eleventh inverter INV11 form an 8-bit output terminal of the 3-bit decoder, which is used for outputting 8-bit binary data.

Figure 9:
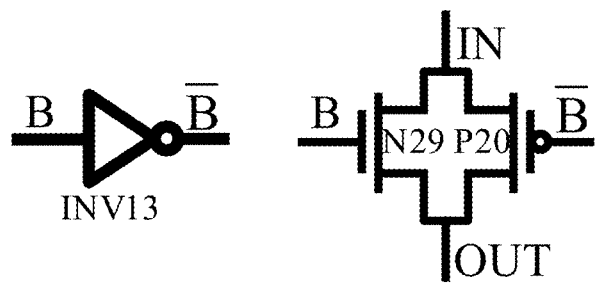
FIG. 9 is a circuit diagram of a transmission gate of the voltage mode weak-PUF circuit with rich challenge-response pairs according to the invention.

In this embodiment, as shown in FIG. 9, the transmission gate comprises a thirteenth inverter INV13, a twenty-ninth NMOS transistor N29 and a twentieth PMOS transistor P20, wherein a drain of the twenty-ninth NMOS transistor N29 and a source of the twentieth PMOS transistor P20 are connected and a connecting terminal thereof is the input terminal of the transmission gate, a source of the twenty-ninth NMOS transistor N29 and a drain of the twentieth PMOS transistor P20 are connected and a connecting terminal thereof is the output terminal of the transmission gate, a gate of the twenty-ninth NMOS transistor N29 and an input terminal of the thirteenth inverter INV13 are connected and a connecting terminal thereof is the control terminal of the transmission gate, and an output terminal of the thirteenth inverter INV13 is connected to a gate of the twentieth PMOS transistor P20.

Figure 10:
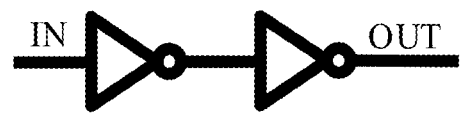
FIG. 10 is a circuit diagram of a buffer of the voltage mode weak-PUF circuit with rich challenge-response pairs according to the invention.

In this embodiment, as shown in FIG. 10, the buffer comprises two inverters, wherein an input terminal of a first inverter is an input terminal of the buffer, an output terminal of a second inverter is an output terminal of the buffer, and an output terminal of the first inverter is connected to an input terminal of the second inverter.

To verify the performance of the voltage mode weak-PUF circuit with rich challenge-response pairs provided by the invention, experimental simulation is carried out on the voltage mode weak-PUF circuit with rich challenge-response pairs.

Figure 11:
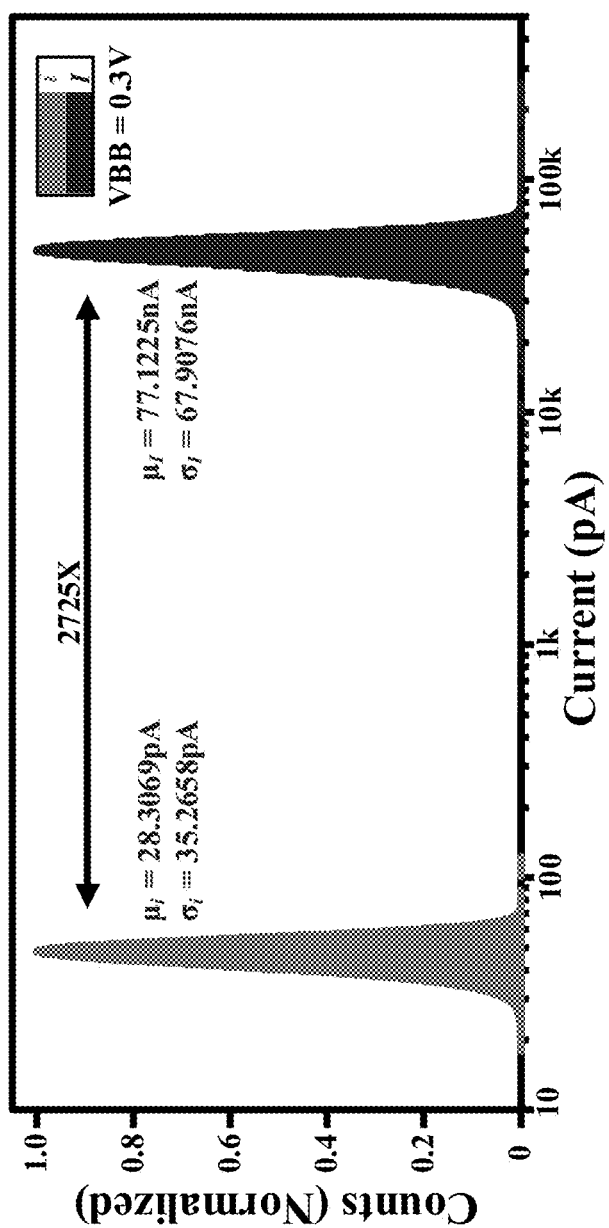
FIG. 11 is a current distribution diagram of a non-gated branch and a gated branch of the voltage mode weak-PUF circuit with rich challenge-response pairs according to the invention.

By performing 1,000 Monte Carlo simulations on the voltage mode weak-PUF circuit with rich challenge-response pairs provided by the invention, the current distribution diagram of a current i across a non-gated branch and a current I across a gated branch is shown in FIG. 11, wherein i is the current across the non-gated branch, I is the current across the gated branch, and VBB=0.3V. It can be visually seen, from FIG. 11, that a desired value of the current across the non-gated branch is i_Mean=28.31 pA and a desired value of the current across the gated branch is I_Mean=77.12 nA, the desired value of the current across the non-gated branch is 2725× times, three orders of magnitude, less than the desired value of the current across the gated branch, indicating that the voltage deviation output by the PUF cell is mainly from the process deviation generated during fabrication of the second NMOS transistor (biased transistor) in the gated branch, and the stability is good.

Figures 12A, 12B:
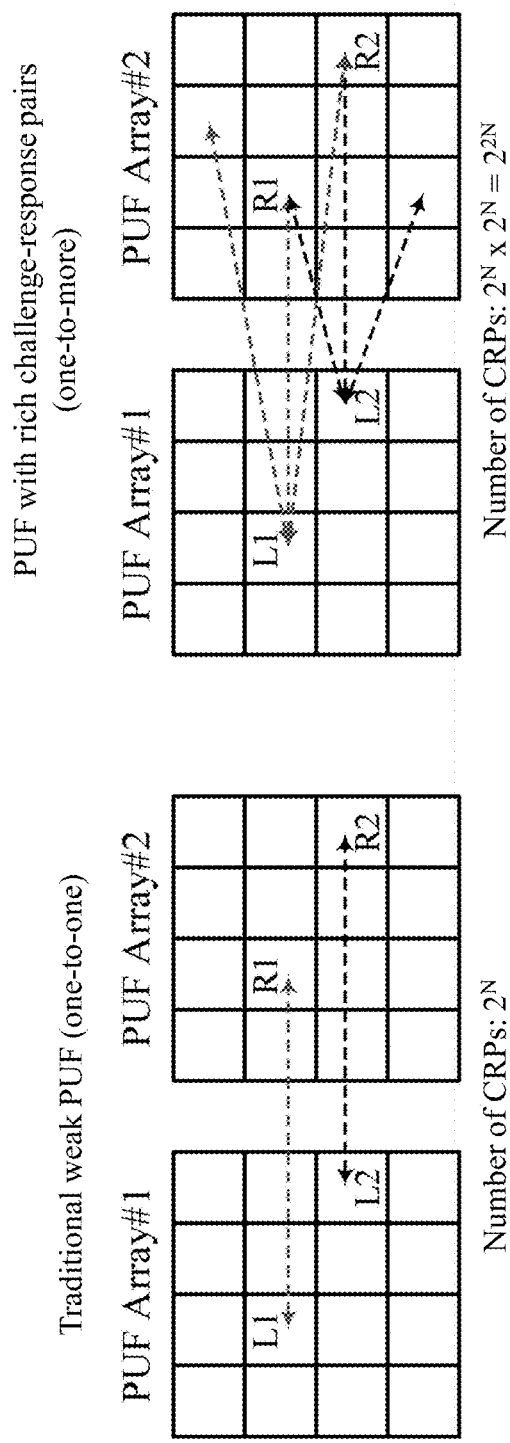
FIG. 12A is a CRP model diagram of a traditional weak-PUF circuit adopting one-to-one PUF arrays.
FIG. 12B is a CRP model diagram of the voltage mode weak-PUF circuit with rich challenge-response pairs according to the invention.

FIG. 12A illustrates a CRP model diagram of a traditional weak-PUF circuit adopting one-to-one PUF arrays, and FIG. 12B illustrates a CRP model diagram of the voltage mode weak-PUF circuit with rich challenge-response pairs according to the invention. When two independent decoding schemes are adopted, matching between PUF cells will be changed from one-to-one matching of a traditional PUF scheme into one-to-more matching of the scheme with rich challenge-response pairs, matching between the PUF cells is matching between all the PUF cells in the two PUF arrays, and the number of finally obtained challenge-response pairs is greatly increased from $2^N$ to $2^N$; and because the reuse rate of the voltage mode weak-PUF circuit is far lower than that of strong-PUF circuits, ML attack algorithms will not work for the voltage mode weak-PUF circuit, thus improving the capacity to resist ML attacks of the voltage mode weak-PUF circuit.

Figure 13:
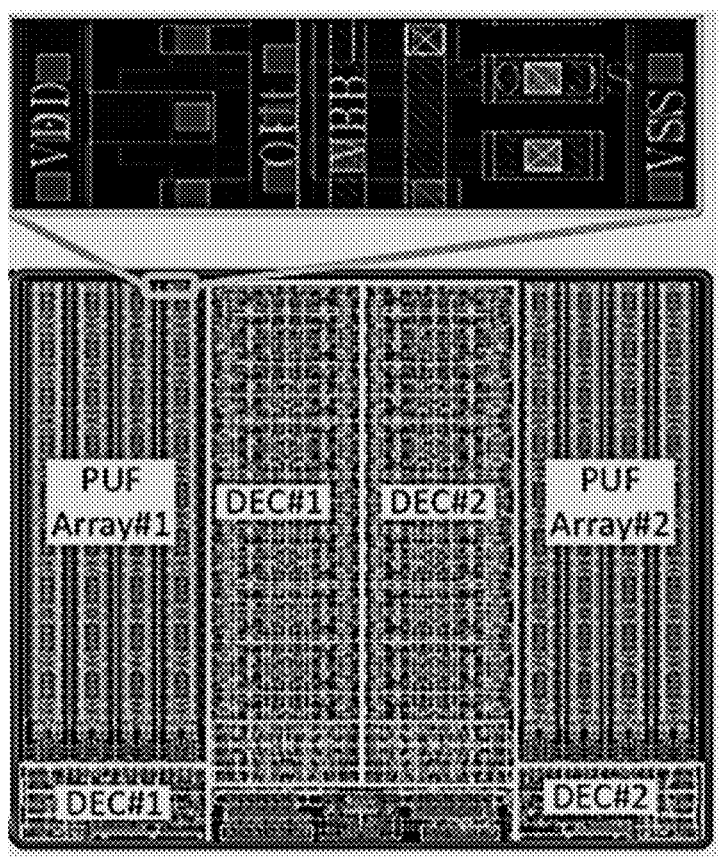
FIG. 13 illustrates the layout of the voltage mode weak-PUF circuit with rich challenge-response pairs according to the invention.

The TSMC 65 nm CMOS is used for implementing the voltage mode weak-PUF circuit with rich challenge-response pairs provided by the invention, and virtuoso software of the cadence software platform is used for implementing the overall layout of the voltage mode weak-PUF circuit with rich challenge-response pairs provided by the invention. As shown in FIG. 13, the layout area of the voltage mode weak-PUF circuit with rich challenge-response pairs provided by the invention is merely 508 µm$^2$, and the characteristic dimension of the PUF cells is merely 0.46F$^2$.

Figure 14:
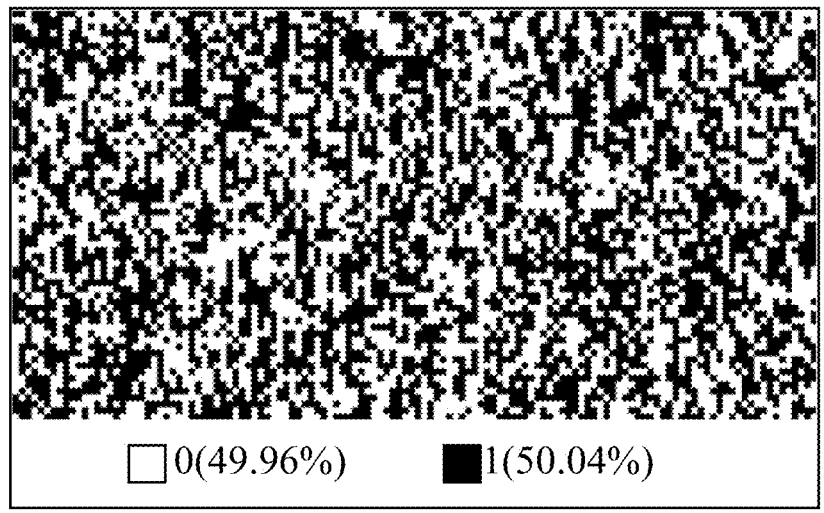
FIG. 14 is a gray image of output responses of the voltage mode weak-PUF circuit with rich challenge-response pairs according to the invention.
Figure 15:
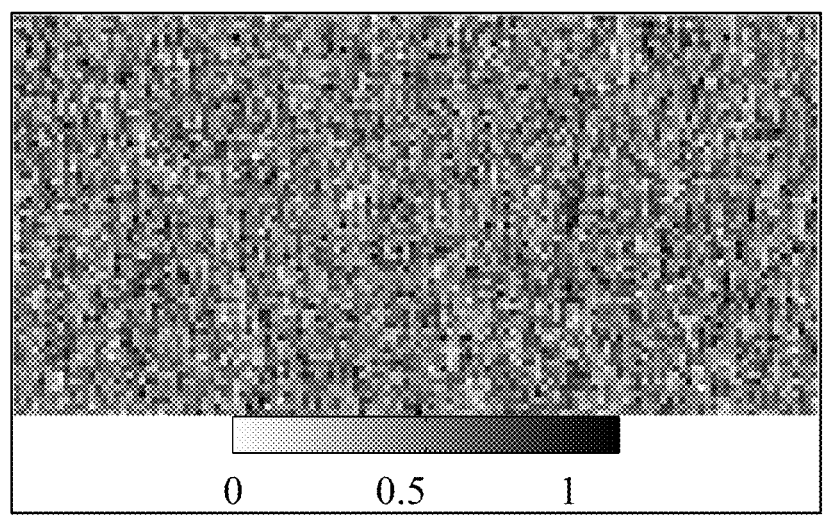
FIG. 15 is an average gray image of output response of the voltage mode weak-PUF circuit with rich challenge-response pairs according to the invention.

The gray image is the most visual method for observing the randomness of the PUF. In the gray image, the white pixel is interpreted as logic "0", and the black pixel is interpreted as logic "1". FIG. 14 is a gray image of output responses of the voltage mode weak-PUF circuit with rich challenge-response pairs according to the invention, and FIG. 15 is an average gray image of output response of the voltage mode weak-PUF circuit with rich challenge-response pairs according to the invention (20 weak-PUF circuits). It can be known, by analyzing FIG. 14, that the probability of "1" (50.04%) generated by any one weak-PUF circuit is very close to the desired value 50%, and the mean value of 0/1 (the probability of "1") of 20 weak-PUF circuits is 49.78%. It can be known, by analyzing FIG. 15, that the gray value is in the vicinity of 0.5, and there is no observable spatial artifact, indicating that the system deviation can be ignored. Therefore, the voltage mode weak-PUF circuit with rich challenge-response pairs provided by the invention has good randomness.

Figure 16:
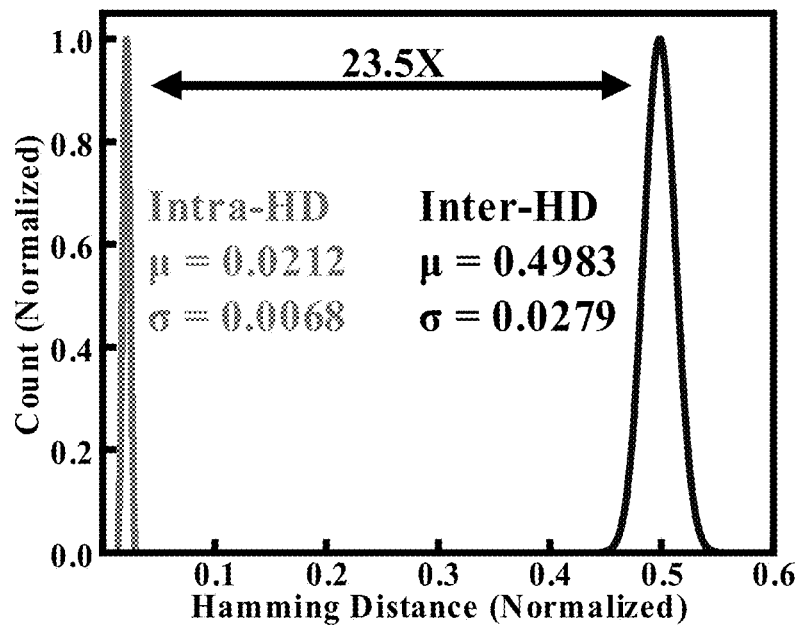
FIG. 16 is a diagram of the inter-Hamming distance and the intra-Hamming distance of the voltage mode weak-PUF circuit with rich challenge-response pairs according to the invention.

The reliability refers to the capacity to generate the same response to different challenges of the PUF under different environmental conditions. To evaluate the reliability R, the average intra-Hamming distance (HDintra) of responses of identical instances of the weak-PUF circuit with rich challenge-response pairs under the same challenge and the same influence of environmental noise is calculated. According to the standard conditions, the operating voltage VDD is 1.2 V, and the environmental temperature is 27° C. According to the comparation condition, the weak-PUF circuit operates in a noisy environment and 20 Monte Carlo simulations are performed on 1,000,000 output responses, and simulation results are shown in FIG. 16. The simulation results indicate that the intra-Hamming distance of the weak-PUF circuit is 2.12%, which is close to 0 under a desired condition, so the stability is 97.88%, indicating that the weak-PUF circuit has good stability. The uniqueness of the PUF refers to the capacity to generate a unique key of different PUS instances with the same challenge under the same environmental condition. The uniqueness of the weak PUF circuit is evaluated by E (HDinter). Under a desired condition, the uniqueness E(HDinter) between any two output responses should be 50%. The result in FIG. 16 indicates that the average Hamming distance between output responses of any two voltage mode weak-PUF circuits with rich challenge-response pairs is 49.83%, which is close to the desired value.

Figure 17:
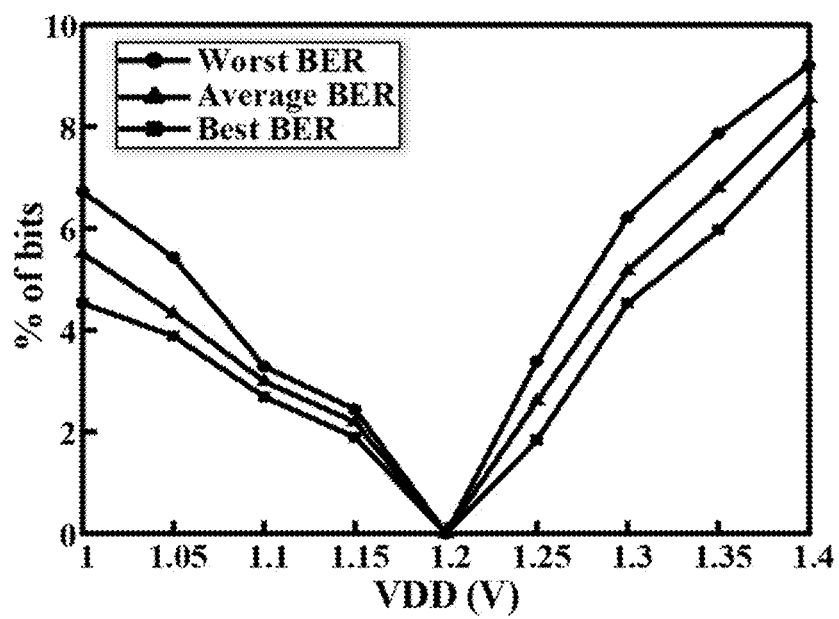
FIG. 17 is a curve chart of the variation with voltage of output responses of the voltage mode weak-PUF circuit with rich challenge-response pairs according to the invention.
Figure 18:
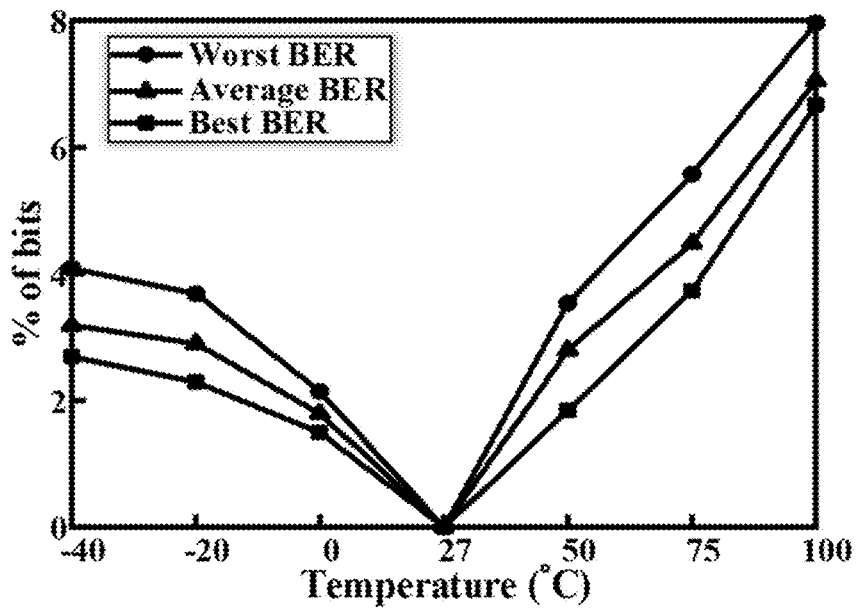
FIG. 18 is a curve chart of the variation with temperature of output responses of the voltage mode weak-PUF circuit with rich challenge-response pairs according to the invention.

The stability is quantized by reading output values of the PUF circuit multiple times and calculating the proportion of instable bits. The stability of outputs of the PUF circuit is affected by the supply voltage and the environmental temperature. Because the supply voltage fluctuates around the standard voltage, the proportion of instable bits caused by voltage changes can be obtained by comparing output responses obtained under the standard operating environment (27° C., 1.2V) and keys obtained under a temperature of 27° C. and a voltage changing between 1.0 V and 1.4 V, as shown in FIG. 17. When the operating voltage is fixed at 1.2 V, keys obtained under a temperature changing between −40° C.-100° C. are compared to obtain the proportion of instable bits caused by the temperature change, as shown in FIG. 18. It can be known, by analyzing FIG. 17, that the voltage sensitivity causing instability is 4.26%/0.1V. It can be known, by analyzing FIG. 18, that the temperature sensitivity causing instability is 0.091%/° C.

Figure 19:
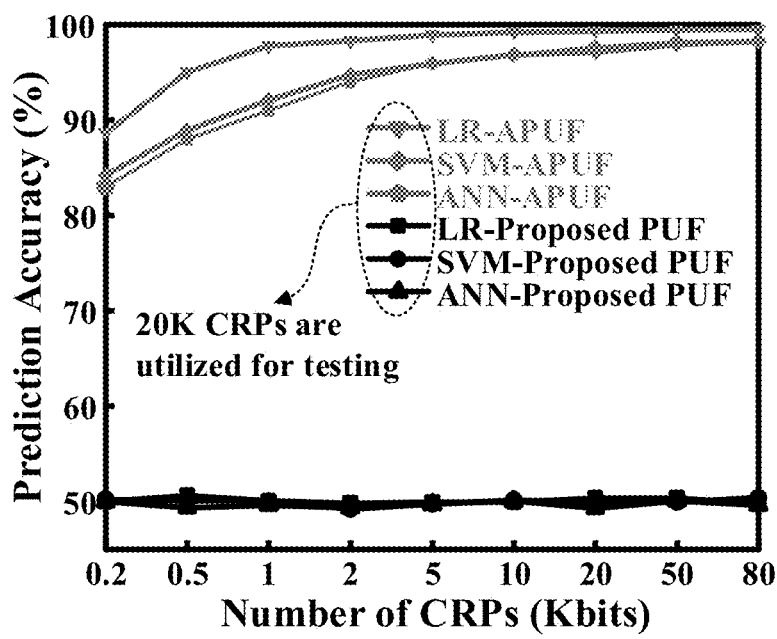
FIG. 19 illustrates the prediction rate of the voltage mode weak-PUF circuit with rich challenge-response pairs to various ML attacks.

Common ML attacks on the PUF circuit include the support vector machine (SAM), the artificial neural network (ANN) and other algorithms, which can model an actual PUF circuit by learning and training CRPs of the PUF circuit, to predict keys generated by the PUF circuit. A traditional strong PUF (APUF) and the PUF circuit provided by the invention are tested, with a test set of 20,000 CRPs and a training set of 80,000-200,000 CRPs, and prediction results are shown in FIG. 19. It can be known, by analyzing FIG. 19, that during ML modeling of the APUF, the prediction rate reaches 90% when the number of CRPs in the training set reaches 1,000, indicating that the APUF can be easily hacked by ML algorithms. During ML modeling of the PUF circuit provided by the invention, the prediction rate is still 50% when the number of CRPs in the training set reaches 80,000, which is equivalent to random guess. Therefore, the voltage mode weak-PUF circuit with rich challenge-response pairs provided by the invention can effectively resist ML algorithm-based modeling attacks.

Compared with the prior art, the invention has the following advantages: the weak-PUF circuit is formed by four decoders, two PUF arrays, a sequential control circuit and a voltage comparator, wherein the four decoders are divided into two independent decoding cells, and each independent decoding cell comprises two decoders, such that traditional one-to-one PUF arrays are replaced with one-to-two PUF arrays, that is, an output signal of one PUF cell selected from a first PUF array is compared with an output signal of one PUF cell selected from a second PUF array to generate and output a response signal; a first row selection signal, a second row selection signal, a first column selection signal and a second column selection signal are combined to form a challenge signal of the voltage mode weak-PUF circuit with rich challenge-response pairs provided by the invention; the voltage mode weak-PUF circuit with rich challenge-response pairs provided by the invention adopts the one-to-two PUF arrays rather than the existing one-to-one PUF arrays, and the number of challenge-response pairs is increased by $2^N$ times, from $2^N$ realized by the traditional one-to-one PUF arrays to $2^N \times 2^N$, wherein N=a+b, such that the number of challenge-response pairs of the voltage mode weak-PUF circuit with rich challenge-response pairs provided by the invention is significantly increased, and the voltage mode weak-PUF circuit has rich challenge-response pairs; in addition, the number of challenge-response pairs that can be generated by the voltage mode weak-PUF circuit with rich challenge-response pairs provided by the invention is $2^N$, and any one PUF cell in one PUF array can be compared with any one PUF cell in the other PUF array to generate an output response, that is, the number of output responses is $2^N$, so the proportion of the PUF cells for generating one challenge-response pair is $2N/2^{2N}=1/2^N$, that is, the reuse rate of the same PUF cell is merely $1/2^N$, greatly improving the capacity to resist ML attacks; in each PUF cell, a first PMOS transistor, a first NMOS transistor and a second NMOS transistor form a common-source amplifier, so the overall structure is simple and the area is small; a sub-threshold voltage VBB is accessed to a second input terminal of the PUF cell (a gate of the second NMOS transistor) to enable the second NMOS transistor to operate in a sub-threshold region, a gate and source of the first PMOS transistor are short-connected to form an MOS diode structure as a load of the common-source amplifier, the first NMOS transistor is used as a switch transistor of the common-source amplifier, and the common-source amplifier operates normally only when a high level is accessed to the gate of the first NMOS transistor; because of the inevitable random process deviation generated during fabrication, the threshold voltages of the MOS transistors are mutually different, an output signal of the output terminal of the PUF cell is mainly from a process deviation generated during fabrication of the second NMOS transistor, and by enabling the second NMOS transistor to operate in the sub-threshold region, the process deviation can be amplified; output terminals of n PUF cells in the same column of each PUF array are connected, and first PMOS transistors of the m PUF cells are connected in parallel, which is equivalent to a large-sized transistor, to ensure that an output voltage of the PUF cell is mainly from the process deviation of the second NMOS transistor of a selected PUF cell, thus guaranteeing the randomness, uniqueness, reliability and stability of a final response signal. Therefore, the voltage mode weak-PUF circuit with rich challenge-response pairs provided by the invention has a large number of challenge-response pairs and a small hardware expenditure, and can resist ML modeling attacks. The PUF circuit provided by the invention is implemented through the TSMC 65 nm CMOS process, the layout area of the PUF circuit is merely 508 $\mu m^2$, the characteristic dimension of the PUF cells is merely $0.46F^2$, and layout simulation results of the PUF circuit indicate that the PUF circuit has good randomness (50.04%), uniqueness (49.8%), reliability (97.9%), stability (96.23%), and capacity to resist ML attacks (the attack prediction rate is still close to 50% random guess when ML learning modeling is carried out based on 80,000 CRPs).

What is claimed is:

1. A voltage mode weak-PUF (physically unclonable function) circuit with rich challenge-response pairs, comprising four decoders, two PUF arrays, a sequential control circuit and a voltage comparator, wherein each PUF array comprises m*n PUF cells and n transmission gates, $m=2^a$, a is an integer greater than or equal to 1, $n=2^b$, b is an integer greater than or equal to 1, the m*n PUF cells are distributed in m rows and n columns, the n transmission gates are distributed in one row and n columns, each transmission gate has a control terminal, an input terminal and an output terminal, each PUF cell has a first input terminal, a second input terminal and an output terminal, and comprises a first P-type metal-oxide-semiconductor (PMOS) transistor, a first N-type metal-oxide-semiconductor (NMOS) transistor and a second NMOS transistor, a supply voltage (VDD) is accessed to a source of the first PMOS transistor, a gate of the first PMOS transistor, a drain of the first PMOS transistor and a drain of the second NMOS transistor are connected and a connecting terminal thereof is the output terminal of the PUF cell, a gate of the second NMOS transistor is the second input terminal of the PUF cell, a source of the second NMOS transistor and a drain of the first NMOS transistor are connected, a gate of the first NMOS transistor is the first input terminal of the PUF cell, and a source of the first NMOS transistor is grounded; in each PUF array, the first input terminals of the n PUF cells in the $j^{th}$ row are connected and a connecting terminal thereof is a $j^{th}$ row address input terminal of the PUF array, j=1, 2, . . . , m, a first row address input terminal to an $m^{th}$ row address input terminal of the PUF array form an m-bit row address input terminal of the PUF array, the second input terminals of the m*n PUF cells are connected and a connecting terminal thereof is a sub-threshold input terminal of the PUF array, to which a sub-threshold voltage (VBB) is accessed, the control terminal of the $k^{th}$ transmission gate is a $k^{th}$ column address input terminal of the PUF array, k=1, 2, . . . , n, a first column address input terminal to an $n^{th}$ column address input terminal of the PUF array form an n-bit column address input terminal of the PUF array, and the input terminal of the $k^{th}$ transmission gate is connected to the output terminals of the m PUF cells in the $k^{th}$ column; the output terminals of the n transmission gates are connected and a connecting terminal thereof is an output terminal of the PUF array; the two PUF arrays are referred to as a first PUF array and a second PUF array respectively; the sequential control circuit is configured to provide an enable control signal for the four decoders and the voltage comparator to enable the four decoders, the two PUF arrays and the voltage comparator to operate cooperatively in a preset sequence; the four decoders are referred to a first decoder, a second decoder, a third decoder and a fourth decoder respectively; a first row selection signal is accessed to the first decoder and is converted by the first decoder into a first m-bit row address signal, which is output to the m-bit row address input terminal of the first PUF array, a first column selection signal is accessed to the second decoder and is converted by the second decoder into a first n-bit column address signal, which is output to the n-bit column address input terminal of the first PUF array, the first m-bit row address signal is used for selecting n PUF cells in one row of the first PUF array to enable the n PUF cells in said row to enter an operating state to generate output signals, the first n-bit column address signal is used for selecting one PUF cells from the n selected PUF cells in the first PUF array and outputting an output signal generated by the selected PUF cell to the voltage comparator, as an output signal of the first PUF array, a second row selection signal is accessed to the third decoder and is converted by the third decoder into a second m-bit row address signal, which is output to the m-bit row address input terminal of the second PUF array, a second column selection signal is accessed to the fourth decoder and is converted by the fourth decoder into a second n-bit column address signal, which is output to the n-bit column address input terminal of the second PUF array, the second m-bit row address signal is used for selecting n PUF cells in one row of the second PUF array to enable the n PUF cells in said row to enter an operating state to generate output signals, the second n-bit column address signal is used for selecting one PUF cell from the n selected PUF cells in said row of the second PUF array and outputting an output signal generated by the selected PUF cell to the voltage comparator, as an output signal of the second PUF array, and the voltage comparator is configured to compare the two output signals output thereto by the first PUF array and the second PUF array to obtain and output a response signal.

2. The voltage mode weak-PUF circuit with rich challenge-response pairs according to claim 1, wherein m is equal to 64, n is equal to 8, the first decoder and the second decoder are both 6-bit decoders and are able to convert 6-bit binary data output thereto into 64-bit binary data and output the 64-bit binary data, the second decoder and the fourth decoder are both 3-bit decoders and are able to convert 3-bit binary data output thereto into 8-bit binary data and output the 8-bit binary data, the first row selection signal and the second row selection signal are both 6-bit binary data, and the first column selection signal and the second column selection signal are both 3-bit binary data; the sequential control circuit generates a first enable control signal (EN_L) and a second enable control signal (EN_C), wherein the first enable control signal (EN_L) is output to the first decoder, the second decoder, the third decoder and the fourth decoder respectively, and the second enable control signal (EN_C) is output to the voltage comparator; when the first enable control signal (EN_L) is a high level, the first decoder and the third decoder operate to perform decoding, and the second decoder and the fourth decoder do not operate and hold the current state; when the first enable controls signal (EN_L) is a low level, the first decoder and the third decoder do not operate and hold the current state, and the second decoder and the fourth decoder operate to perform decoding; when the second enable control signal (EN_C) is a high level, the voltage comparator operates to compare the output signals output thereto by the two PUF arrays to obtain and output the response signal; and when the second enable control signal (EN_C) is a low level, the voltage comparator is turned off, and no valid value is output via an output terminal of the voltage comparator.

3. The voltage mode weak-PUF circuit with rich challenge-response pairs according to claim 2, wherein the voltage comparator has a first input terminal, a second input terminal, an enable terminal, a first calibration terminal, a second calibration terminal and an output terminal, wherein the first input terminal of the voltage comparator is connected to the output terminal of the first PUF array, the second input terminal of the voltage comparator is connected to the output terminal of the second PUF array, the enable terminal of the voltage comparator is connected to the sequential control circuit and allows the second enable control signal (EN_C) to be accessed thereto, a first calibration voltage (Vcm) is accessed to the first calibration terminal of the voltage comparator, a second calibration voltage (Vcp) is accessed to the second calibration terminal of the voltage comparator, and the first calibration voltage (Vcm) and the second calibration voltage (Vcp) are used for enabling the proportion of response signals 0/1 output by the output terminal of the voltage comparator to be close to a desired value 50%; the voltage comparator comprises a second PMOS transistor, a third PMOS transistor, a fourth PMOS transistor, a fifth PMOS transistor, a sixth PMOS transistor, a seventh PMOS transistor, a third NMOS transistor, a fourth NMOS transistor, a fifth NMOS transistor, a sixth NMOS transistor, a seventh NMOS transistor, an eighth NMOS transistor and a ninth NMOS transistor, the supply voltage (VDD) is accessed to a source of the second PMOS transistor, a source of the third PMOS transistor, a source of the fourth PMOS transistor, a source of the fifth PMOS transistor, a source of the sixth PMOS transistor and a source of the seventh PMOS transistor, a gate of the second PMOS transistor, a gate of the fourth PMOS transistor, a gate of the third PMOS transistor, a gate of the third NMOS transistor and a gate of the seventh PMOS transistor are connected and a connecting terminal thereof is the enable terminal of the voltage comparator, a drain of the second PMOS transistor, a source of the eighth NMOS transistor, a drain of the fourth NMOS transistor and a drain of the fifth NMOS transistor are connected, a drain of the third PMOS transistor, a source of the ninth NMOS transistor, a drain of the sixth NMOS transistor and a drain of the seventh NMOS transistor are connected, a drain of the fourth PMOS transistor, a drain of the fifth PMOS transistor, a drain of the eighth NMOS transistor, a gate of the sixth PMOS transistor and a gate of the ninth NMOS transistor are connected, a gate of the fifth PMOS transistor, a gate of the eighth NMOS transistor, a drain of the sixth PMOS transistor, a drain of the seventh PMOS transistor and a drain of the ninth NMOS transistor are connected and a connecting terminal thereof is the output terminal of the voltage comparator, a source of the third NMOS transistor is grounded, a drain of the third NMOS transistor, a drain of the fourth NMOS transistor, a drain of the fifth NMOS transistor, a drain of the sixth NMOS transistor and a drain of the seventh NMOS transistor are connected, a gate of the fourth NMOS transistor is the second calibration terminal of the voltage comparator, a gate of the fifth NMOS transistor is the second input terminal of the voltage comparator, a gate of the sixth NMOS transistor is the first input terminal of the voltage comparator, and a gate of the seventh NMOS transistor is the first calibration terminal of the voltage comparator.

4. The voltage mode weak-PUF circuit with rich challenge-response pairs according to claim 2, wherein the sequential control circuit comprises an eighth PMOS transistor, a ninth PMOS transistor, a tenth PMOS transistor, an eleventh PMOS transistor, a tenth NMOS transistor, an eleventh NMOS transistor, a twelfth NMOS transistor, a thirteenth NMOS transistor, a first inverter, a second inverter, a third inverter, two two-input AND gates and a delay cells, wherein each two-input AND gate has a first input terminal, a second input terminal and an output terminal, the two two-input AND gates are referred to a first AND gate and a second AND gate respectively, the delay cell is formed by multiple buffers connected in series and has an input terminal and an output terminal, the supply voltage (VDD) is accessed to a source of the ninth PMOS transistor and a source of the eleventh PMOS transistor, a gate of the ninth PMOS transistor and a gate of the tenth NMOS transistor are connected and a connecting terminal thereof is an enable terminal of the sequential control circuit, to which an enable signal (CEN) is accessed, a drain of the ninth PMOS transistor and a source of the eighth PMOS transistor are connected, a gate of the eighth PMOS transistor, a gate of the thirteenth NMOS transistor, the second input terminal of the first AND gate and an input terminal of the second inverter are connected and a connecting terminal thereof is a clock terminal of the sequential control circuit, to which a clock signal CLK is accessed, a drain of the eighth PMOS transistor, a drain of the eleventh NMOS transistor, a drain of the tenth PMOS transistor, a drain of the thirteenth NMOS transistor and an input terminal of the first inverter, a gate of the eleventh NMOS transistor, a gate of the tenth PMOS transistor and an output terminal of the second inverter are connected, a source of the eleventh NMOS transistor and a drain of the tenth NMOS transistor are connected, a source of the tenth NMOS transistor is grounded, a gate of the eleventh PMOS transistor, a gate of the twelfth NMOS transistor, an output terminal of the first inverter and the first input terminal of the first AND gate are connected, a drain of the eleventh PMOS transistor and a source of the tenth PMOS transistor are connected, a source of the thirteenth NMOS transistor and a drain of the twelfth NMOS transistor are connected, a source of the twelfth NMOS transistor is grounded, the output terminal of the first AND gate, the input terminal of the delay cell and the second input terminal of the second AND gate are connected and a connecting terminal thereof is a first output terminal of the sequential control circuit, which is used for outputting the first enable control signal (EN_L), the output terminal of the delay cell is connected to an input terminal of the third inverter, an output terminal of the third inverter is connected to the first input terminal of the second AND gate, and the output terminal of the second AND gate is a second output terminal of the sequential control circuit, which is used for outputting the second enable control signal (EN_C).

5. The voltage mode weak-PUF circuit with rich challenge-response pairs according to claim 4, wherein the delay cell is formed by 20 buffers connected in series, wherein an input terminal of a first buffer is the input terminal of the delay cell, an output terminal of a twentieth buffer is the output terminal of the delay cell, an output terminal of a $d^{th}$ buffer is an input terminal of a $(d+1)^{th}$ buffer, and d=1, 2, . . . , 19.

6. The voltage mode weak-PUF circuit with rich challenge-response pairs according to claim 2, wherein the 6-bit decoder comprises three decoder front-end cells and 64 three-input AND gates, wherein each three-input AND gate has a first input terminal, a second input terminal, a third input terminal and an output terminal, the 64 three-input AND gates are referred to a first AND gate to a sixty-fourth AND gate respectively, each decoder front-end cell has an enable terminal, two input terminals and four output terminals, and the three decoder front-end cells are referred to a first decoder front-end cell, a second decoder front-end cell and a third decoder front-end cell respectively; the enable terminals of the three decoder front-end cells are connected and a connecting terminal thereof is an enable terminal of the 6-bit decoder, to which the first enable control signal (EN_L) is accessed, the two input terminals of the first decoder front-end cell, the two input terminals of the second decoder front-end cell and the two input terminals of the third decoder front-end cell form a 6-bit input terminal of the 6-bit decoder, to which 6-bit binary data is accessed, the output terminals of the first AND gate to the sixty-fourth AND gate form a 64-bit output terminal of the 6-bit decoder, which is used for outputting 64-bit binary data, the four output terminals of the first decoder front-end cell are respectively connected to the first input terminals of the first, second, third and fourth AND gates, the first input terminals of the fifth, sixth, seventh and eighth AND gates, the first input terminals of the ninth, tenth, eleventh and twelfth AND gates, the first input terminals of the thirteenth, fourteenth, fifteenth and sixteenth AND gates, the first input terminals of the seventeenth, eighteenth, nineteenth and twentieth AND gates, the first input terminals of the twenty-first, twenty-second, twenty-third and twenty-fourth AND gates, the first input terminals of the twenty-fifth, twenty-sixth, twenty-seventh and twenty-eighth AND gates, the first input terminals of the twenty-ninth, thirtieth, thirty-first and thirty-second AND gates, the first input terminals of the thirty-third, thirty-fourth, thirty-fifth and thirty-sixth AND gates, the first input terminals of the thirty-seventh, thirty-eighth, thirty-ninth and fortieth AND gates, the first input terminals of the forty-first, forty-second, forty-third and forty-fourth AND gates, the first input terminals of the forty-fifth, forty-sixth, forty-seventh and forty-eighth AND gates, the first input terminals of the forty-ninth, fiftieth, fifty-first and fifty-second AND gates, the first input terminals of the fifty-third, fifty-fourth, fifty-fifth and fifty-sixth AND gates, the first input terminals of the fifty-seventh, fifty-eighth, fifty-ninth and sixtieth AND gates, and the first input terminals of the sixty-first, sixty-second, sixty-third and sixty-fourth AND gates in a one-to-one corresponding manner, a first output terminal of the second decoder front-end cell is respectively connected to the second input terminals of the first, second, third and fourth AND gates, the second input terminals of the seventeenth, eighteenth, nineteenth and twentieth AND gates, the second input terminals of the thirty-third, thirty-fourth, thirty-fifth and thirty-sixth AND gates, the second input terminals of the forty-ninth, fiftieth, fifty-first and fifty-second AND gates, and the second input terminals of the fifty-third, fifty-fourth, fifty-fifth and fifty-sixth AND gates, a third output terminal of the second decoder front-end cell is respectively connected to the second input terminals of the ninth, tenth, eleventh and twelfth AND gates, the second input terminals of the twenty-fifth, twenty-sixth, twenty-seventh and twenty-eighth AND gates, the second input terminals of the forty-first, forty-second, forty-third and forty-fourth AND gates, and the second input terminals of the fifty-seventh, fifty-eighth, fifty-ninth and sixtieth AND gates, a fourth output terminal of the second decoder front-end cell is respectively connected to the second input terminals of the thirteenth, fourteenth, fifteenth and sixteenth AND gates, the second input terminals of the twenty-ninth, thirtieth, thirty-first and thirty-second AND gates, the second input terminals of the forty-fifth, forty-sixth, forty-seventh and forty-eighth AND gates, and the second input terminals of the sixty-first, sixty-second, sixty-third and sixty-fourth AND gates, a first output terminal of the third decoder front-end cell is respectively connected to the third input terminals of the first, second, third, fourth, fifth, sixth, seventh, eighth, ninth, tenth, eleventh, twelfth, thirteenth, fourteenth, fifteenth and sixteenth AND gates, a second output terminal of the third decoder front-end cell is respectively connected to the third input terminals of the seventeenth, eighteenth, nineteenth, twentieth, twenty-first, twenty-second, twenty-third, twenty-fourth, twenty-fifth, twenty-sixth, twenty-seventh, twenty-eighth, twenty-ninth, thirtieth, thirty-first and thirty-second AND gates, a third output terminal of the third decoder front-end cell is respectively connected to the third input terminals of the thirty-third, thirty-fourth, thirty-fifth, thirty-sixth, thirty-seventh, thirty-eighth, thirty-ninth, fortieth, forty-first, forty-second, forty-third, forty-fourth, forty-fifth, forty-sixth, forty-seventh and forty-eighth AND gates, and a fourth output terminal of the third decoder front-end cell is respectively connected to the third input terminals of the forty-ninth, fiftieth, fifty-first, fifty-second, fifty-third, fifty-fourth, fifty-fifth, fifty-sixth, fifty-seventh, fifty-eighth, fifty-ninth, sixtieth, sixty-first, sixty-second, sixty-third and sixty-fourth AND gates; each decoder front-end cell comprises a first latch, a second latch and four two-input AND gates, the first latch and the second latch each have an input terminal, an enable terminal, an output terminal and an inverted output terminal, the four two-input AND gates each have a first input terminal, a second input terminal and an output terminal, the four two-input AND gates are referred to as a third AND gate, a fourth AND gate, a fifth AND gate and a sixth AND gate respectively, the enable terminal of the first latch and the enable terminal of the second latch are connected and a connecting terminal thereof is the enable terminal of the decoder front-end cell, the input terminal of the first latch and the input terminal of the second latch are used as the two input terminals of the decoder front-end cell, the output terminal of the first latch is respectively connected to the first input terminal of the third AND gate and the first input terminal of the fourth AND gate, the inverted output terminal of the first latch is respectively connected to the first input terminal of the fifth AND gate and the first input terminal of the sixth AND gate, the output terminal of the second latch is respectively connected to the second input terminal of the third AND gate and the second input terminal of the fifth AND gate, the inverted output terminal of the second latch is respectively connected to the second input terminal of the fourth AND gate and the second input terminal of the sixth AND gate, and the output terminals of the four two-input AND gates are used as the four output terminals of the decoder front-end cell.

7. The voltage mode weak-PUF circuit with rich challenge-response pairs according to claim 2, wherein the 3-bit decoder comprises a third latch, a fourth latch, a fifth latch, a fourth inverter, a fifth inverter, a sixth inverter, a seventh inverter, an eighth inverter, a ninth inverter, a tenth inverter, an eleventh inverter, a twelfth inverter, a twelfth PMOS transistor, a thirteenth PMOS transistor, a fourteenth PMOS transistor, a fifteenth PMOS transistor, a sixteenth PMOS transistor, a seventeenth PMOS transistor, an eighteenth PMOS transistor, a nineteenth PMOS transistor, a fourteenth NMOS transistor, a fifteenth NMOS transistor, a sixteenth NMOS transistor, a seventeenth NMOS transistor, an eighteenth NMOS transistor, a nineteenth NMOS transistor, a twentieth NMOS transistor, a twenty-first NMOS transistor, a twenty-second NMOS transistor, a twenty-third NMOS transistor, a twenty-fourth NMOS transistor, a twenty-fifth NMOS transistor, twenty-sixth NMOS transistor, a twenty-seventh NMOS transistor and a twenty-eighth NMOS transistor, the third latch, the fourth latch and the fifth latch each have an input terminal, an enable terminal, an output terminal and an inverted output terminal, an input terminal of the twelfth inverter, the enable terminal of the third latch, the enable terminal of the fourth latch and the enable terminal of the fifth latch are connected and a connecting terminal thereof is an enable terminal of the 3-bit decoder, to which the first enable control signal (EN_L) is accessed, the input terminal of the third latch, the input terminal of the fourth latch and the input terminal of the fifth latch form a 3-bit input terminal of the 3-bit decoder, to which 3-bit binary data is input, an output terminal of the twelfth inverter is respectively connected to a gate of the fourteenth NMOS transistor, a gate of the twelfth PMOS transistor, a gate of the thirteenth PMOS transistor, a gate of the fourteenth PMOS transistor, a gate of the fifteenth PMOS transistor, a gate of the sixteenth PMOS transistor, a gate of the seventeenth PMOS transistor, a gate of the eighteenth PMOS transistor and a gate of the nineteenth PMOS transistor, the output terminal of the third latch is respectively connected to a gate of the twenty-second NMOS transistor, a gate of the twenty-fourth NMOS transistor, a gate of the twenty-sixth NMOS transistor and a gate of the twenty-eighth NMOS transistor, the inverted output terminal of the third latch is respectively connected to a gate of the twenty-first NMOS transistor, a gate of the twenty-third NMOS transistor, a gate of the twenty-fifth NMOS transistor and a gate of the twenty-seventh NMOS transistor, the output terminal of the fourth latch is respectively connected to a gate of the eighteenth NMOS transistor and a gate of the twentieth NMOS transistor, the inverted output terminal of the fourth latch is respectively connected to a gate of the seventeenth NMOS transistor and a gate of the nineteenth NMOS transistor, the output terminal of the fifth latch is connected to a gate of the sixteenth NMOS transistor, the inverted output terminal of the fifth latch is connected to a gate of the fifteenth NMOS transistor, a source of the fourteenth NMOS transistor is grounded, a drain of the fourteenth NMOS transistor is respectively connected to a source of the fifteenth NMOS transistor and a source of the sixteenth NMOS transistor, a drain of the fifteenth NMOS transistor is respectively connected to a source of the seventeenth NMOS transistor and a source of the eighteenth NMOS transistor, a drain of the sixteenth NMOS transistor is respectively connected to a source of the nineteenth NMOS transistor and a source of the twentieth NMOS transistor, a drain of the seventeenth NMOS transistor is respectively connected to a source of the twenty-first NMOS transistor and a source of the twenty-second NMOS transistor, a drain of the eighteenth NMOS transistor is respectively connected to a source of the twenty-third NMOS transistor and a source of the twenty-fourth NMOS transistor, a drain of the nineteenth NMOS transistor is respectively connected to a source of the twenty-fifth NMOS transistor and a source of the twenty-sixth NMOS transistor, a drain of the twentieth NMOS transistor is respectively connected to a source of the twenty-seventh NMOS transistor and a source of the twenty-eighth NMOS transistor, a drain of the twenty-first NMOS transistor is respectively connected to a drain of the twelfth PMOS transistor and an input terminal of the fourth inverter, a drain of the twenty-second NMOS transistor is respectively connected to a drain of the thirteenth PMOS transistor and an input terminal of the fifth inverter, a drain of the twenty-third NMOS transistor is respectively connected to a drain of the fourteenth PMOS transistor and an input terminal of the sixth inverter, a drain of the twenty-fourth NMOS transistor is respectively connected to a drain of the fifteenth PMOS transistor and an input terminal of the seventh inverter, a drain of the twenty-fifth NMOS transistor is respectively connected to a drain of the sixteenth PMOS transistor and an input terminal of the eighth inverter, a drain of the twenty-sixth NMOS transistor is respectively connected to a drain of the seventeenth PMOS transistor and an input terminal of the ninth inverter, a drain of the twenty-seventh NMOS transistor is respectively connected to a drain of the eighteenth PMOS transistor and an input terminal of the tenth inverter, a drain of the twenty-eighth NMOS transistor is respectively connected to a drain of the nineteenth PMOS transistor and an input terminal of the eleventh inverter, the supply voltage (VDD) is accessed to a source of the twelfth PMOS transistor, a source of the thirteenth PMOS transistor, a source of the fourteenth PMOS transistor, a source of the fifteenth PMOS transistor, a source of the sixteenth PMOS transistor, a source of the seventeenth PMOS transistor, a source of the eighteenth PMOS transistor and a source of the nineteenth PMOS transistor, an output terminal of the fourth inverter, an output terminal of the fifth inverter, an output terminal of the sixth inverter, an output terminal of the seventh inverter, an output terminal of the eighth inverter, an output terminal of the ninth inverter, an output terminal of the tenth inverter and an output terminal of the eleventh inverter form a 8-bit output terminal of the 3-bit decoder, which is used for outputting 8-bit binary data.

8. The voltage mode weak-PUF circuit with rich challenge-response pairs according to claim 2, wherein the transmission gate comprises a thirteenth inverter, a twenty-ninth NMOS transistor and a twentieth PMOS transistor, wherein a drain of the twenty-ninth NMOS transistor and a source of the twentieth PMOS transistor are connected and a connecting terminal thereof is the input terminal of the transmission gate, a source of the twenty-ninth NMOS transistor and a drain of the twentieth PMOS transistor are connected and a connecting terminal thereof is the output terminal of the transmission gate, a gate of the twenty-ninth NMOS transistor and an input terminal of the thirteenth inverter are connected and a connecting terminal thereof is the control terminal of the transmission gate, and an output terminal of the thirteenth inverter is connected to a gate of the twentieth PMOS transistor.

9. The voltage mode weak-PUF circuit with rich challenge-response pairs according to claim 5, wherein the buffer comprises two inverters, wherein an input terminal of a first inverter is an input terminal of the buffer, an output terminal of a second inverter is an output terminal of the buffer, and an output terminal of the first inverter is connected to an input terminal of the second inverter.

* * * * *